United States Patent
Zhao

(10) Patent No.: US 12,470,328 B2
(45) Date of Patent: Nov. 11, 2025

(54) METHOD FOR SIDELINK INTERFACE DUPLICATION TRANSMISSION, TERMINAL, AND NETWORK-SIDE DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 946 days.

(21) Appl. No.: 17/634,554

(22) PCT Filed: Jun. 11, 2020

(86) PCT No.: PCT/CN2020/095657
§ 371 (c)(1),
(2) Date: Feb. 11, 2022

(87) PCT Pub. No.: WO2021/027384
PCT Pub. Date: Feb. 18, 2021

(65) Prior Publication Data
US 2022/0286234 A1   Sep. 8, 2022

(30) Foreign Application Priority Data
Aug. 13, 2019   (CN) .......................... 201910745818.9

(51) Int. Cl.
*H04L 1/1829*   (2023.01)
*H04L 1/1812*   (2023.01)
(Continued)

(52) U.S. Cl.
CPC .......... *H04L 1/1812* (2013.01); *H04W 28/24* (2013.01); *H04W 92/18* (2013.01)

(58) Field of Classification Search
CPC ....... H04L 1/1812; H04L 1/1864; H04L 1/08; H04W 28/24; H04W 92/18; H04W 76/14;
(Continued)

(56) References Cited

U.S. PATENT DOCUMENTS

| | | | |
|---|---|---|---|
| 12,058,564 B2 * | 8/2024 | Tang | ..................... H04W 76/11 |
| 2019/0158993 A1 | 5/2019 | Kwon | |

(Continued)

FOREIGN PATENT DOCUMENTS

| | | |
|---|---|---|
| CN | 107147479 A | 9/2017 |
| CN | 107342851 A | 11/2017 |

(Continued)

OTHER PUBLICATIONS

Nokia et al., "Discussion on activation of Duplication", 3GPP TSG-RAN WG2 #100, Reno, USA, Nov. 27-Dec. 1, 2017, total 2 pages, R2-1712942.

(Continued)

*Primary Examiner* — Joseph E Dean, Jr.
(74) *Attorney, Agent, or Firm* — KILPATRICK TOWNSEND & STOCKTON LLP

(57) ABSTRACT

Disclosed are a method for sidelink interface duplication transmission, a terminal, and a network-side device. The method includes: a terminal acquires duplication transmission configuration information of a sidelink interface; the terminal receives explicit instruction information or implicit instruction information transmitted by a network-side device and determines via the explicit instruction information or the implicit instruction information that at least one radio bearer of the sidelink interface activates or deactivates duplication transmission.

20 Claims, 9 Drawing Sheets

(51) Int. Cl.
*H04W 28/24* (2009.01)
*H04W 92/18* (2009.01)

(58) Field of Classification Search
CPC ..... H04W 76/15; H04W 76/11; H04W 76/27; H04W 4/40
See application file for complete search history.

(56) References Cited

U.S. PATENT DOCUMENTS

2019/0268799 A1* 8/2019 Hong ................. H04W 4/70
2021/0006318 A1* 1/2021 Kim .................. H04L 1/1812

FOREIGN PATENT DOCUMENTS

| | | |
|---|---|---|
| CN | 108737045 A | 11/2018 |
| CN | 109547168 A | 3/2019 |
| WO | 2015163625 A1 | 10/2015 |
| WO | 2018164499 A1 | 9/2018 |
| WO | 2019029375 A1 | 2/2019 |
| WO | 2019057154 A1 | 3/2019 |
| WO | 2019061194 A1 | 4/2019 |
| WO | 2019136655 A1 | 7/2019 |

OTHER PUBLICATIONS

ZTE,"Consideration on data duplication activation", 3GPP TSG-RAN WG2 Meeting #101, Athens, Greece, Feb. 26-Mar. 2, 2018, total 4 pages, R2-1801958.
CATT,"SLRB Configuration Procedure based on the QoS Framework", 3GPP TSG-RAN WG2 Meeting #105bis, Reno, USA, May 13-17, 2019, total 8 pages, R2-1905802(Revision of R2-1903174).

* cited by examiner

METHOD FOR SIDELINK INTERFACE DUPLICATION TRANSMISSION, TERMINAL, AND NETWORK-SIDE DEVICE

CROSS-REFERENCE OF RELATED APPLICATIONS

The present application is a US National Stage of International Application No. PCT/CN2020/095657, filed on Jun. 11, 2020, which claims priority to Chinese Patent Application No. 201910745818.9, filed with the China National Intellectual Property Administration on Aug. 13, 2019 and entitled "Method for Sidelink Interface Duplication Transmission, Terminal, and Network-Side Device", which is hereby incorporated by reference in its entirety.

FIELD

The present application relates to the field of wireless communication technologies and particularly to a method for sidelink interface duplication transmission, a terminal and a network-side device.

BACKGROUND

The 5G New Radio (NR) system generally supports three types of services: enhanced Mobile Broadband (eMBB), massive Machine Type Communications (mMTC), and Ultra-Reliable and Low Latency Communications (URLLC).

In order to support vertical applications in the industry, the NR Vehicle to Everything (V2X) is introduced. In order to improve the reliability of transmission of the V2X message and reduce the latency, duplication transmission may be supported. For example, the current URLLC service introduces the duplication transmission mechanism, in which the same Protocol Data Unit (PDU) of Packet Data Convergence Protocol (PDCP) layer is transmitted through paths, and transmission reliability is improved and the transmission delay is reduced through multi-path transmission gain.

For the Long Term Evolution (LTE) V2X, logical channel parameters corresponding to two Radio Bearers (RBs) used for duplication transmission in the duplication transmission mechanism of the sidelink interface have a pre-defined correspondence. For example, assuming that the logical channel parameter corresponding to one RB used for duplication transmission is Logical Channel ID m (LCID m), then the logical channel parameter corresponding to the other RB used for duplication transmission may be LCID n, where m and n are positive integers.

However, for the 5G NR V2X, the logical channels are configured by the network. If the association relationship between the logical channel parameters corresponding to two RBs used for duplication transmission is still fixed, then the allocation of logical channels will be less flexible, and a part of logical channels dedicated to duplication transmission may be reserved for the sidelink interface, resulting in low utilization of logical channels.

SUMMARY

The present application provides a method for sidelink interface duplication transmission, a terminal and a network-side device, to provide a more flexible duplication transmission mechanism of the sidelink interface.

In a first aspect, a method for sidelink interface duplication transmission provided by an embodiment of the present application includes: obtaining, by a terminal, duplication transmission configuration information of a sidelink interface; receiving, by the terminal, explicit indication information or implicit indication information sent by a network-side device, and determining that at least one radio bearer of the sidelink interface activates or deactivates duplication transmission through the explicit indication information or the implicit indication information.

In an embodiment of the present application, the network-side device sends the duplication transmission configuration information of the sidelink interface and controls the radio bearer of the sidelink interface to activate or deactivate duplication transmission in an explicit or implicit manner, so that the terminal can determine that the radio bearer of the sidelink interface activates or deactivates duplication transmission according to the explicit or implicit indication information sent by the network-side device after receiving the duplication transmission configuration information of the sidelink interface configured by the network-side device, making the duplication transmission mechanism of the sidelink interface more flexible.

In a second aspect, a method for sidelink interface duplication transmission provided by an embodiment of the present application includes: configuring, by a network-side device, duplication transmission configuration information of a sidelink interface for a terminal; sending, by the network-side device, explicit indication information or implicit indication information to the terminal, and determining that at least one radio bearer of the sidelink interface activates or deactivates duplication transmission through the explicit indication information or the implicit indication information.

In a third aspect, an embodiment of the present application further provides a terminal for sidelink interface duplication transmission, including a processor and a memory, where the memory is configured to store a program executable by the processor, and the processor is configured to read the program in the memory and perform: obtaining duplication transmission configuration information of a sidelink interface; receiving explicit indication information or implicit indication information sent by a network-side device, and determining that at least one radio bearer of the sidelink interface activates or deactivates duplication transmission through the explicit indication information or the implicit indication information.

In a fourth aspect, an embodiment of the present application further provides a network-side device for sidelink interface duplication transmission, including a processor and a memory, where the memory is configured to store a program executable by the processor, and the processor is configured to read the program in the memory and perform: configuring duplication transmission configuration information of a sidelink interface for a terminal; sending explicit indication information or implicit indication information to the terminal, and determining that at least one radio bearer of the sidelink interface activates or deactivates duplication transmission through the explicit indication information or the implicit indication information.

In a fifth aspect, an embodiment of the present application further provides a computer storage medium storing a computer program thereon, where the program, when executed by a processor, implements steps of the method described in the first aspect or the second aspect described above.

These and other aspects of the present application will be more clear and easy to understand in the description of following embodiments.

BRIEF DESCRIPTION OF THE DRAWINGS

In order to illustrate the embodiments of the present application more clearly, the accompanying drawings which need to be used in describing embodiments will be introduced below briefly. The accompanying drawings described below are only some embodiments of the present application, and other accompanying drawings may also be obtained.

DETAILED DESCRIPTION OF EMBODIMENTS

The present application will be further illustrated below in details with reference to the accompanying drawings. The described embodiments are merely a part of embodiments of the present application but not all embodiments. Based upon embodiments of the present application, all of other embodiments obtained pertain to the protection scope of the present application.

Figure 1:
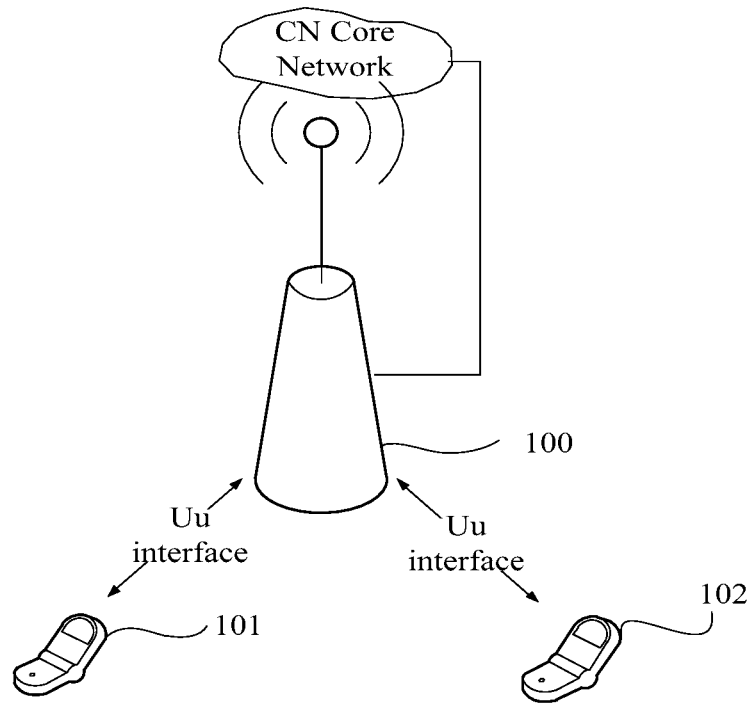
FIG. 1 is a schematic diagram of a communication mode of a traditional cellular network according to an embodiment of the present application.

For the 5G NR, in order to support vertical applications in the industry, the NR V2X is introduced; and in order to improve the reliability of transmission of the V2X message and reduce the delay, the duplication transmission method may be used. As shown in FIG. 1, the traditional wireless communication uses the cellular network communication mode, that is, a terminal 101 and a network-side device 100 transmit uplink and downlink data and/or control information through a Uu interface, and a terminal 102 and the network-side device 100 transmit uplink and downlink data and/or control information through a Uu interface. The duplication transmission of the 5G Uu interface will be introduced below briefly at first.

The 5G NR system generally supports three types of services as follows: enhanced Mobile Broadband (eMBB); massive Machine Type Communications (mMTC); Ultra-Reliable and Low Latency Communications (URLLC).

For the URLLC, since the URLLC has higher requirements on both the latency and the reliability, one solution provided now by the Third Generation Partnership Project (3GPP) is to introduce the duplication transmission mechanism, that is, the same PDU of the PDCP layer is transmitted through paths, to increase the transmission reliability and lower the transmission latency through the multi-path transmission gain.

Figure 2A:
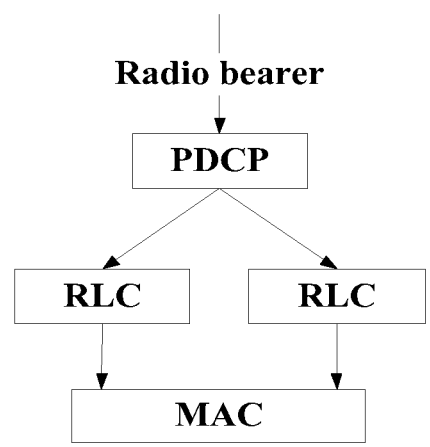
FIG. 2A is a schematic diagram of a duplication transmission model under carrier aggregation according to an embodiment of the present application.

As shown in FIG. 2A, for the duplication transmission model under Carrier Aggregation (CA): an RB of the PDCP layer is transmitted through logical channels respectively at the Radio Link Control (RLC) layer, each RB corresponds to a PDCP entity, and each logical channel corresponds to an RLC entity. Logical channels corresponding to the RB for duplication transmission are processed by a Medium Access Control (MAC) entity at the MAC layer, and data from different RLC logical channels is mapped to one or more carriers for transmission.

Figure 2B:
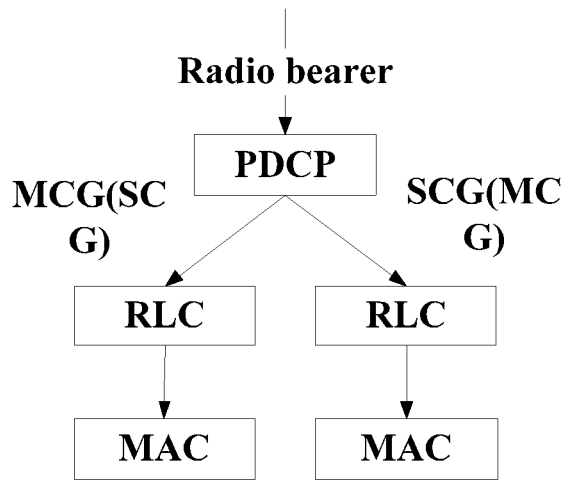
FIG. 2B is a schematic diagram of a duplication transmission model under dual connectivity according to an embodiment of the present application.

As shown in FIG. 2B, for the duplication transmission model under Dual connectivity (DC): an RB of the PDCP layer is transmitted through logical channels respectively at the RLC layer, each RB corresponds to a PDCP entity, and each logical channel corresponds to an RLC entity. Logical channels corresponding to the RB for duplication transmission are respectively mapped to different MAC entities, and data of the logical channels corresponding to different RLC entities is mapped to different carriers for transmission.

In the LTE V2X, logical channel parameters corresponding to two RBs used for duplication transmission in the duplication transmission mechanism of the sidelink interface have a pre-defined correspondence. However, for the 5G NR V2X, the logical channels are configured by the network. If the association relationship between the logical channel parameters corresponding to two RBs used for duplication transmission is still fixed, then the allocation of logical channels will be less flexible, and a part of logical channels dedicated to duplication transmission may be reserved for the sidelink interface, resulting in the low utilization of logical channels. Therefore, the sidelink mode provided in embodiments of the present application is used to provide a more flexible duplication transmission mechanism of the sidelink interface.

Figure 3:
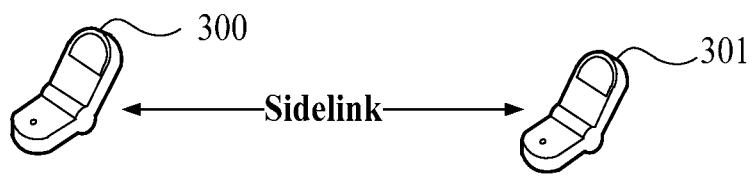
FIG. 3 is a schematic diagram of a sidelink mode according to an embodiment of the present application.

As shown in FIG. 3, the sidelink refers to the way in which data transmission can be performed between terminals through a direct communication link (also called Sidelink), for example, a terminal 300 and a terminal 301 may perform the direct communicate through the Sidelink link.

The wireless interface corresponding to the Sidelink link is called sidelink interface, which is also called Sidelink interface or PC5 interface. Here, the V2X data may be transmitted through a Uu interface or a sidelink interface. The specific interface used for transmission is determined by the upper layer.

A method for sidelink interface duplication transmission provided by an embodiment of the present application may be applied to a terminal or a network-side device.

It should be noted that the terminal is a device with the wireless communication function, and may be deployed on land, including indoor or outdoor, handheld or vehicle-mounted; or may also be deployed on the water (such as ship, etc.); or may also be deployed in the air (e.g., on the airplane, balloon and satellite, etc.). The terminal may be: a mobile phone, a Pad, a computer with wireless transceiver function, a Virtual Reality (VR) terminal, an Augmented Reality (AR) terminal, a wireless terminal in the industrial control, a wireless terminal in the self-driving, a wireless terminal in the remote medical, a wireless terminal in the smart grid, a wireless terminal in the transportation safety, a wireless terminal in the smart city, a wireless terminal in the smart home, etc.; or may be various forms of UE, Mobile Station (MS), terminal device.

The network-side device may be a gNB, a macro base station, a micro base station, a Central Unit (CU) or a Distributed Unit (DU) in the 5G.

The term "and/or" in embodiments of the present application describes the association relationship of associated objects, indicating that there may be three relationships, for example, A and/or B may represent: only A, both A and B, and only B. The character "/" generally indicates that the associated objects have a kind of "or" relationship.

The application scenarios described in embodiments of the present application are intended to illustrate embodiments of the present application more clearly, and do not constitute a limitation on the embodiments of the present application. With the appearance of new application scenarios, the embodiments of the present application are also applicable to similar problems.

Embodiment 1: a method for sidelink interface duplication transmission provided in this embodiment may be applied to a system for sidelink interface duplication transmission, including a terminal and a network-side device. The implementation steps of the terminal and the network-side device when the system performs the sidelink interface duplication transmission will be explained below.

Figure 4:
FIG. 4 is a system schematic diagram of a sidelink mode according to an embodiment of the present application.

As shown in FIG. 4, the system includes a terminal 400 and a network-side device 401.

The network-side device 401 is configured to configure duplication transmission configuration information of a sidelink interface for the terminal; send explicit indication information or implicit indication information to the terminal, and determine that at least one radio bearer of the sidelink interface activates or deactivates duplication transmission through the explicit indication information or implicit indication information.

The terminal is configured to obtain the duplication transmission configuration information of the sidelink interface; receive the explicit indication information or implicit indication information sent by the network-side device, and determine that at least one radio bearer of the sidelink interface activates or deactivates duplication transmission through the explicit indication information or implicit indication information.

In an embodiment, due to different states of the terminal, the network-side device configures the duplication transmission configuration information of the sidelink interface for the terminal according to the terminal in different states. Since the terminal has different states, there are different modes in which the network-side device configures the duplication transmission configuration information of the sidelink interface, so that there are different modes in which the terminal obtains the duplication transmission configuration information of the sidelink interface, where the states of the terminal include but not limited to: Radio Resource Control (RRC) connected state; RRC idle state; RRC inactive state; offline state.

According to the state of the terminal, the modes in which the network-side device configures the duplication transmission configuration information for the radio bearer of the sidelink interface of the terminal includes any one of following configuration modes.

Configuration mode 1: for the terminal in the RRC connected state, the network-side device configures the duplication transmission configuration information for the radio bearer of the sidelink interface of the terminal through an RRC layer dedicated signaling.

The terminal obtains the duplication transmission configuration information configured by the network-side device for the radio bearer of the sidelink interface of the terminal through an RRC layer dedicated signaling.

Here, the RRC layer dedicated signaling may be Radio Resource Control (RRC) signaling or Media Access Control (MAC) signaling, etc. This embodiment does not make too many limitations on the RRC layer dedicated signaling.

In the configuration mode 1, the duplication transmission configuration information includes any one or more of: a source identifier of the sidelink interface, for example, identifier of source layer 2 (Source L2 ID); a destination identifier of the sidelink interface, for example, identifier of destination layer 2 (destination L2 ID); a radio bearer identifier of the radio bearer of the sidelink interface; an identifier of a logical channel used for duplication transmission; an identifier of a carrier or Bandwidth Part (BWP) corresponding to each logical channel used for duplication transmission.

Configuration mode 2: for the terminal in the RRC idle state or RRC inactive state, the network-side device configures the duplication transmission configuration information for a Quality of Service (QoS) parameter of the sidelink interface of the terminal through a system message; where the system message may be a System Information Block (SIB) message.

The terminal obtains the duplication transmission configuration information configured by the network-side device for the QoS parameter of the sidelink interface of the terminal through the system message.

In the configuration mode 2, the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

Configuration mode 3: for the terminal in the offline state, the network-side device configures the duplication transmission configuration information for a QoS parameter of the sidelink interface of the terminal through pre-configuration.

The terminal obtains the duplication transmission configuration information configured for the QoS parameter of the sidelink interface of the terminal through pre-configuration information.

In the configuration mode 3, the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

This embodiment provides at least two methods for controlling the duplication transmission of the sidelink interface. One is to explicitly control the radio bearer of the sidelink interface to activate or deactivate duplication transmission, and the other is to implicitly control the radio bearer of the sidelink interface to activate or deactivate duplication transmission. The detailed description will be given below according to different methods.

Firstly, the method in which the network-side device explicitly controls the radio bearer of the sidelink interface to activate or deactivate duplication transmission will be illustrated.

The network-side device explicitly controls the radio bearer of the sidelink interface to activate or deactivate duplication transmission, including: controlling the radio bearer of the sidelink interface to activate or deactivate duplication transmission through RRC layer dedicated signaling or through a Medium Access Control-Control Element (MAC CE). Here, the network-side device configures the radio bearer of the sidelink interface to activate or deactivate duplication transmission through the RRC layer dedicated signaling, where the configuration is activation and de-configuration is deactivation; the network-side device determines the radio bearer of the sidelink interface to activate through activation indication information carried in the MAC CE, and determines the radio bearer of the sidelink interface to deactivate through deactivation indication information carried in the MAC CE.

It is easy to understand that the method for controlling duplication transmission explicitly in this embodiment includes any one of following explicit modes:

Explicit mode 1: the network-side device sends the duplication transmission configuration information carrying a radio bearer identifier of the sidelink interface to the terminal through RRC layer dedicated signaling, and determines that the radio bearer of the sidelink interface activates duplication transmission.

The terminal receives the duplication transmission configuration information carrying a radio bearer identifier of the sidelink interface sent by the network-side device through RRC layer dedicated signaling, and determines that the radio bearer of the sidelink interface activates duplication transmission.

Explicit mode 2: the network-side device sends the duplication transmission configuration information carrying a radio bearer identifier of the sidelink interface to the terminal through RRC layer dedicated signaling in which the radio bearer identifier is defaulted, and determines that the radio bearer of the sidelink interface deactivates duplication transmission.

The terminal receives the duplication transmission configuration information carrying a radio bearer identifier of the sidelink interface sent by the network-side device through RRC layer dedicated signaling in which the radio bearer identifier is defaulted, and determines that the radio bearer of the sidelink interface deactivates duplication transmission.

Explicit mode 3: the network-side device sends the duplication transmission configuration information carrying a radio bearer identifier of the sidelink interface to the terminal through RRC layer dedicated signaling, where the duplication transmission configuration information includes a duplication transmission activation identifier for the radio bearer; and determines that the radio bearer of the sidelink interface activates duplication transmission.

The terminal receives the duplication transmission configuration information carrying a radio bearer identifier of the sidelink interface sent by the network-side device through RRC layer dedicated signaling, where the duplication transmission configuration information includes a duplication transmission activation identifier for the radio bearer; and determines that the radio bearer of the sidelink interface activates duplication transmission.

Explicit mode 4: the network-side device sends the duplication transmission configuration information carrying a radio bearer identifier of the sidelink interface to the terminal through RRC layer dedicated signaling, where the duplication transmission configuration information includes a duplication transmission deactivation identifier for the radio bearer; and determines that the radio bearer of the sidelink interface deactivates duplication transmission.

The terminal receives the duplication transmission configuration information carrying a radio bearer identifier of the sidelink interface sent by the network-side device through RRC layer dedicated signaling, where the duplication transmission configuration information includes a duplication transmission deactivation identifier for the radio bearer; and determines that the radio bearer of the sidelink interface deactivates duplication transmission.

Explicit mode 5: the network-side device determines that the radio bearer of the sidelink interface activates duplication transmission through activation indication information corresponding to the radio bearer of the sidelink interface carried by an MAC CE for controlling duplication transmission activation and/or deactivation of the sidelink interface.

The terminal receives an MAC CE for controlling duplication transmission activation and/or deactivation of the sidelink interface, and determines that the radio bearer of the sidelink interface activates duplication transmission according to activation indication information corresponding to the radio bearer of the sidelink interface carried by the MAC CE.

Explicit mode 6: the network-side device determines that the radio bearer of the sidelink interface deactivates duplication transmission through deactivation indication information corresponding to the radio bearer of the sidelink interface carried by an MAC CE for controlling duplication transmission activation and/or deactivation of the sidelink interface.

The terminal receives an MAC CE for controlling duplication transmission activation and/or deactivation of the sidelink interface, and determines that the radio bearer of the sidelink interface deactivates duplication transmission according to deactivation indication information corresponding to the radio bearer of the sidelink interface carried by the MAC CE.

In one embodiment, the MAC CE for controlling duplication transmission activation and/or deactivation of the sidelink interface may include any one of: 1. communication interface indication information corresponding to the MAC CE, and activation and/or deactivation state indication information corresponding to all radio bearers configured with duplication transmission on the communication interface; 2. communication interface indication information corresponding to the MAC CE, and activation and/or deactivation state indication information of all logical channels corresponding to each of all radio bearers configured with duplication transmission on the communication interface; 3. communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; 4. communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

The arrangement order of the activation and/or deactivation state indication information in the MAC CE includes any one or more of following cases.

Case 1: if the MAC CE corresponds to radio bearers of the sidelink interface, the activation and/or deactivation state indication information corresponding to all radio bearers of the sidelink interface configured with duplication transmission on the communication interface is arranged in the MAC CE in order of identifiers of the radio bearers of the sidelink interface from low to high.

For example, the activation state indication information corresponding to all radio bearers of the sidelink interface configured with duplication transmission on the communication interface is arranged in the MAC CE in order of identifiers of the radio bearers of the sidelink interface from low to high; or the deactivation state indication information corresponding to all radio bearers of the sidelink interface configured with duplication transmission on the communication interface is arranged in the MAC CE in order of identifiers of the radio bearers of the sidelink interface from low to high; or the activation and deactivation state indication information corresponding to all radio bearers of the sidelink interface configured with duplication transmission on the communication interface is arranged in the MAC CE in order of identifiers of the radio bearers of the sidelink interface from low to high.

Case 2: if the MAC CE corresponds to radio bearers of the sidelink interface, the activation and/or deactivation state indication information corresponding to all radio bearers of the sidelink interface configured with duplication transmission on the communication interface is arranged in the MAC CE in order of identifiers of the radio bearers of the sidelink interface from high to low.

For example, the activation state indication information corresponding to all radio bearers of the sidelink interface configured with duplication transmission on the communication interface is arranged in the MAC CE in order of identifiers of the radio bearers of the sidelink interface from high to low; or the deactivation state indication information corresponding to all radio bearers of the sidelink interface configured with duplication transmission on the communication interface is arranged in the MAC CE in order of identifiers of the radio bearers of the sidelink interface from high to low; or the activation and deactivation state indication information corresponding to all radio bearers of the sidelink interface configured with duplication transmission on the communication interface is arranged in the MAC CE in order of identifiers of the radio bearers of the sidelink interface from high to low.

Case 3: if any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE in order of identifiers of the logical channels from low to high.

For example, the activation state indication information of all logical channels corresponding to each of all radio bearers of the sidelink interface configured with duplication transmission on the communication interface is arranged in the MAC CE in order of identifiers of the logical channels from low to high; or the deactivation state indication information of all logical channels corresponding to each of all radio bearers of the sidelink interface configured with duplication transmission on the communication interface is arranged in the MAC CE in order of identifiers of the logical channels from low to high; or the activation and deactivation state indication information of all logical channels corresponding to each of all radio bearers of the sidelink interface configured with duplication transmission on the communication interface is arranged in the MAC CE in order of identifiers of the logical channels from low to high.

Case 4: if any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE in order of identifiers of the logical channels from high to low.

For example, the activation state indication information of all logical channels corresponding to each of all radio bearers of the sidelink interface configured with duplication transmission on the communication interface is arranged in the MAC CE in order of identifiers of the logical channels from high to low; or the deactivation state indication information of all logical channels corresponding to each of all radio bearers of the sidelink interface configured with duplication transmission on the communication interface is arranged in the MAC CE in order of identifiers of the logical channels from high to low; or the activation and deactivation state indication information of each logical channel corresponding to all radio bearers of the sidelink interface configured with duplication transmission on the communication interface is arranged in the MAC CE in order of identifiers of the logical channels from high to low.

As a possible implementation, the communication interface indication information corresponding to the MAC CE is located in an MAC subheader or MAC CE payload of the MAC CE.

Secondly, the method in which the network-side device implicitly controls the radio bearer of the sidelink interface to activate or deactivate duplication transmission will be illustrated.

The network-side device configures threshold information corresponding to a transmission parameter of the sidelink interface for the terminal, so that the terminal determines to activate duplication transmission when the transmission parameter is lower than a threshold and deactivate duplication transmission when the transmission parameter is not lower than the threshold.

The terminal receives the threshold information corresponding to a transmission parameter of the sidelink interface configured by the network-side device, to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

In one embodiment, the configured threshold information includes any one or more of: threshold information configured based on the radio bearer of the sidelink interface; threshold information configured based on source and destination identifiers of the sidelink interface; threshold information configured based on a QoS parameter.

In one embodiment, duplication transmission is determined to be activated when the transmission parameter is lower than the threshold and duplication transmission is determined to be deactivated when the transmission parameter is not lower than the threshold, and the transmission parameter of the sidelink interface includes any one or more of: channel quality of the sidelink interface; signal strength of the sidelink interface.

In one embodiment, duplication transmission is determined to be activated when the transmission parameter is not lower than the threshold and duplication transmission is determined to be deactivated when the transmission parameter is lower than the threshold, and the transmission parameter of the sidelink interface includes any one or more of: a quantity of times the sidelink interface continuously receives Hybrid Automatic Repeat reQuest Negative ACKnowledge (HARQ NACK) feedback; data packet waiting time of the radio bearer of the sidelink interface.

In addition, this embodiment may also provide a terminal that actively reports auxiliary information to the network-side device to assist the network-side device in determining to activate or deactivate the radio bearer. In this embodiment, the network-side device may determine to activate or deactivate the radio bearer according to the auxiliary information reported by the terminal in one case, and may autonomously determine to activate or deactivate the radio bearer in the other case.

In this embodiment, the trigger condition for the terminal to report the auxiliary information for activation includes any one of following reporting conditions.

Reporting condition 1 for triggering activation: the terminal determines that the auxiliary information reporting condition for duplication transmission activation is satisfied when determining that the channel quality or signal strength of the sidelink interface is lower than a threshold.

Reporting condition 2 for triggering activation: the terminal determines that the auxiliary information reporting condition for duplication transmission activation is satisfied when determining that data packet waiting time of the radio bearer of the sidelink interface with duplication transmission is greater than a threshold.

Reporting condition 3 for triggering activation: the terminal determines that the auxiliary information reporting condition for duplication transmission activation is satisfied when determining that a quantity of times the sidelink interface continuously receives HARQ NACK feedback is greater than a threshold.

In this embodiment, the trigger condition for the terminal to report the auxiliary information for deactivation includes any one of following reporting conditions.

Reporting condition 1 for triggering deactivation: determining that the auxiliary information reporting condition for duplication transmission deactivation is satisfied when determining that the channel quality or signal strength of the sidelink interface is not lower than a threshold.

Reporting condition 2 for triggering deactivation: determining that the auxiliary information reporting condition for duplication transmission deactivation is satisfied when determining that data packet waiting time of the radio bearer of the sidelink interface with duplication transmission is not greater than a threshold.

Reporting condition 3 for triggering deactivation: determining that the auxiliary information reporting condition for duplication transmission deactivation is satisfied when determining that a quantity of times the sidelink interface continuously receives HARQ NACK feedback is not greater than a threshold.

In one embodiment, the auxiliary information includes any one or more of: source identifier information of the sidelink interface; destination identifier information of the sidelink interface; identifier information of the radio bearer of the sidelink interface; identifier information of the radio bearer of the sidelink interface that exceeds a set threshold of data packet waiting time; identifier information that a set quantity of HARQ NACK feedbacks are continuously received.

In one embodiment, the identifier information of the radio bearer includes any one of: an identifier of the radio bearer of the sidelink interface; a logical channel identifier of the radio bearer of the sidelink interface; a source identifier of the sidelink interface, a destination identifier of the sidelink interface, and an identifier of the radio bearer of the sidelink interface; a source identifier of the sidelink interface, a destination identifier of the sidelink interface, and a logical channel identifier of the sidelink interface; a source identifier of the sidelink interface, a destination identifier of the sidelink interface, a communication type identifier of the sidelink interface, and an identifier of the radio bearer of the sidelink interface; a source identifier of the sidelink interface, a destination identifier of the sidelink interface, a communication type identifier of the sidelink interface, and a logical channel identifier of the sidelink interface.

Embodiment 2: a first method for sidelink interface duplication transmission for a terminal in the RRC connected state is as follows.

Figure 5:
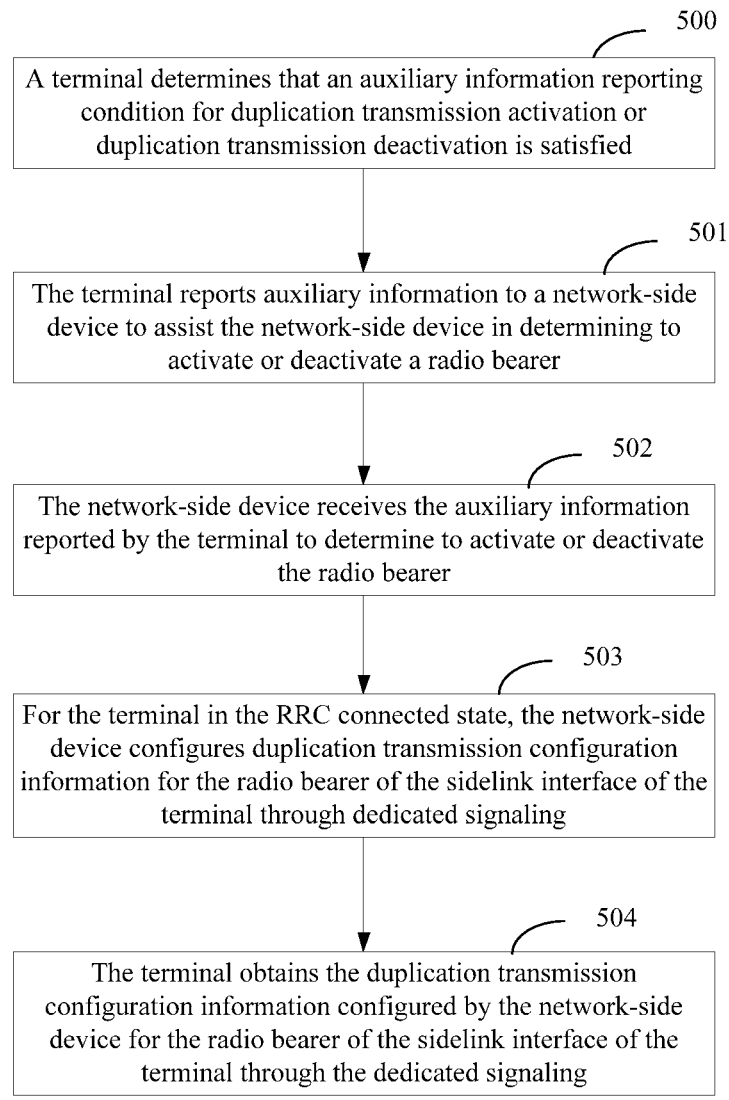
FIG. 5 is a schematic flowchart of a first method for sidelink interface duplication transmission for a terminal in a Radio Resource Control (RRC) connected state according to an embodiment of the present application.

As shown in FIG. 5, the implementation process is as follows.

Step 500: a terminal determines that an auxiliary information reporting condition for duplication transmission activation or duplication transmission deactivation is satisfied.

Step 501: the terminal reports auxiliary information to a network-side device to assist the network-side device in determining to activate or deactivate a radio bearer.

Here, steps 500 and 501 are steps according to one embodiment.

Step 502: the network-side device receives the auxiliary information reported by the terminal to determine to activate or deactivate the radio bearer.

In one embodiment, the network-side device may autonomously determine to activate or deactivate the radio bearer.

Step 503: for the terminal in the RRC connected state, the network-side device configures duplication transmission configuration information for the radio bearer of the sidelink interface of the terminal through an RRC layer dedicated signaling.

Step 504: the terminal obtains the duplication transmission configuration information configured by the network-side device for the radio bearer of the sidelink interface of the terminal through the RRC layer dedicated signaling.

Embodiment 3: a second method for sidelink interface duplication transmission for a terminal in the RRC connected state is as follows.

Figure 6:
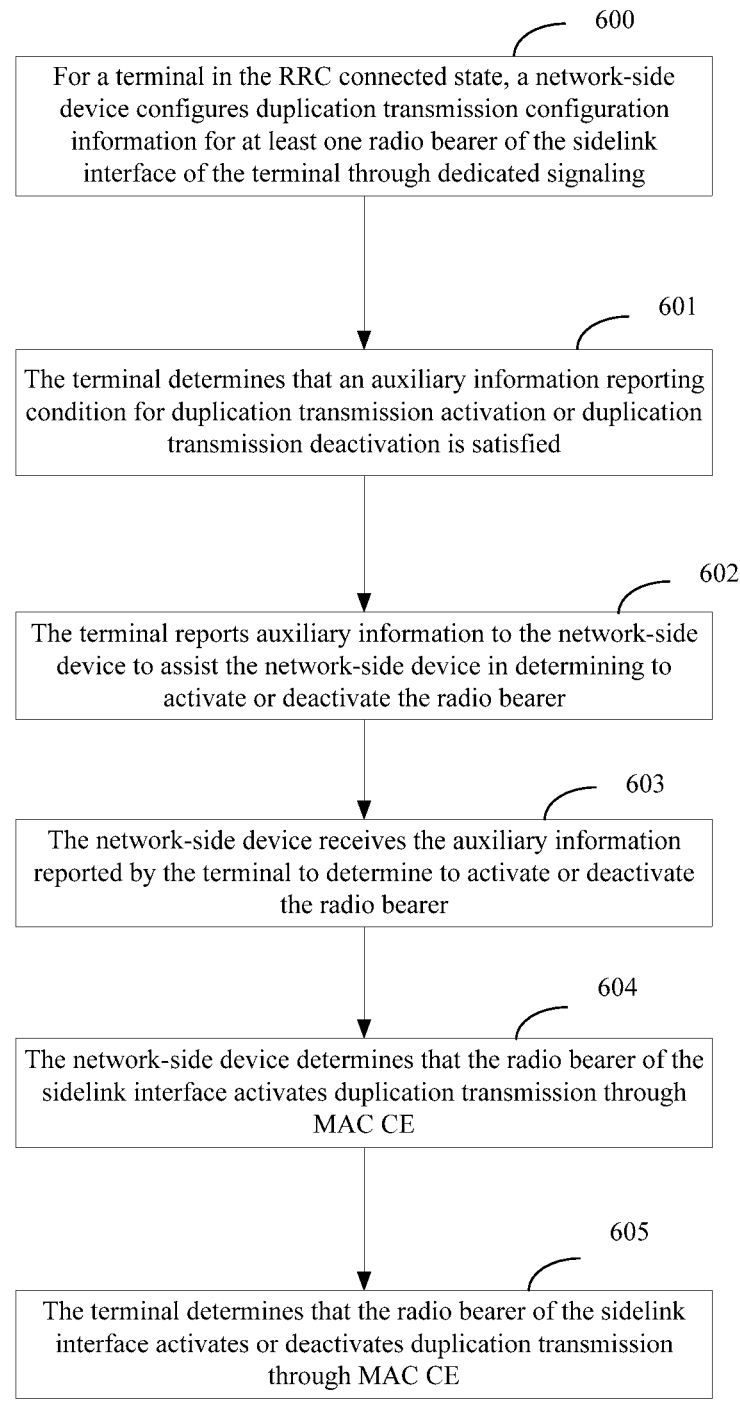
FIG. 6 is a schematic flowchart of a second method for sidelink interface duplication transmission for a terminal in the RRC connected state according to an embodiment of the present application.

As shown in FIG. 6, the implementation process is as follows.

Step 600: for a terminal in the RRC connected state, a network-side device configures duplication transmission configuration information for at least one radio bearer of the sidelink interface of the terminal through an RRC layer dedicated signaling.

Step 601: the terminal determines that an auxiliary information reporting condition for duplication transmission activation or duplication transmission deactivation is satisfied.

Step 602: the terminal reports auxiliary information to the network-side device to assist the network-side device in determining to activate or deactivate the radio bearer.

Here, steps 601 and 602 are steps, according to one embodiment.

Step 603: the network-side device receives the auxiliary information reported by the terminal to determine to activate or deactivate the radio bearer.

In one embodiment, the network-side device may autonomously determine to activate or deactivate the radio bearer.

Step 604: the network-side device determines that the radio bearer of the sidelink interface activates duplication transmission through MAC CE.

The network-side device determines that the radio bearer of the sidelink interface activates duplication transmission through activation indication information corresponding to the radio bearer of the sidelink interface carried by an MAC CE for controlling duplication transmission activation and/or deactivation of the sidelink interface; or the network-side device determines that the radio bearer of the sidelink interface deactivates duplication transmission through deactivation indication information corresponding to the radio bearer of the sidelink interface carried by an MAC CE for controlling duplication transmission activation and/or deactivation of the sidelink interface.

Step 605: the terminal determines that the radio bearer of the sidelink interface activates or deactivates duplication transmission through MAC CE.

The terminal receives an MAC CE for controlling duplication transmission activation and/or deactivation of the sidelink interface, and determines that the radio bearer of the sidelink interface activates duplication transmission according to the activation indication information corresponding to the radio bearer of the sidelink interface carried by the MAC CE; or the terminal receives an MAC CE for controlling duplication transmission activation and/or deactivation of the sidelink interface, and determines that the radio bearer of the sidelink interface deactivates duplication transmission according to the deactivation indication information corresponding to the radio bearer of the sidelink interface carried by the MAC CE.

Embodiment 4: a third method for sidelink interface duplication transmission for a terminal in the RRC connected state is as follows.

Figure 7:
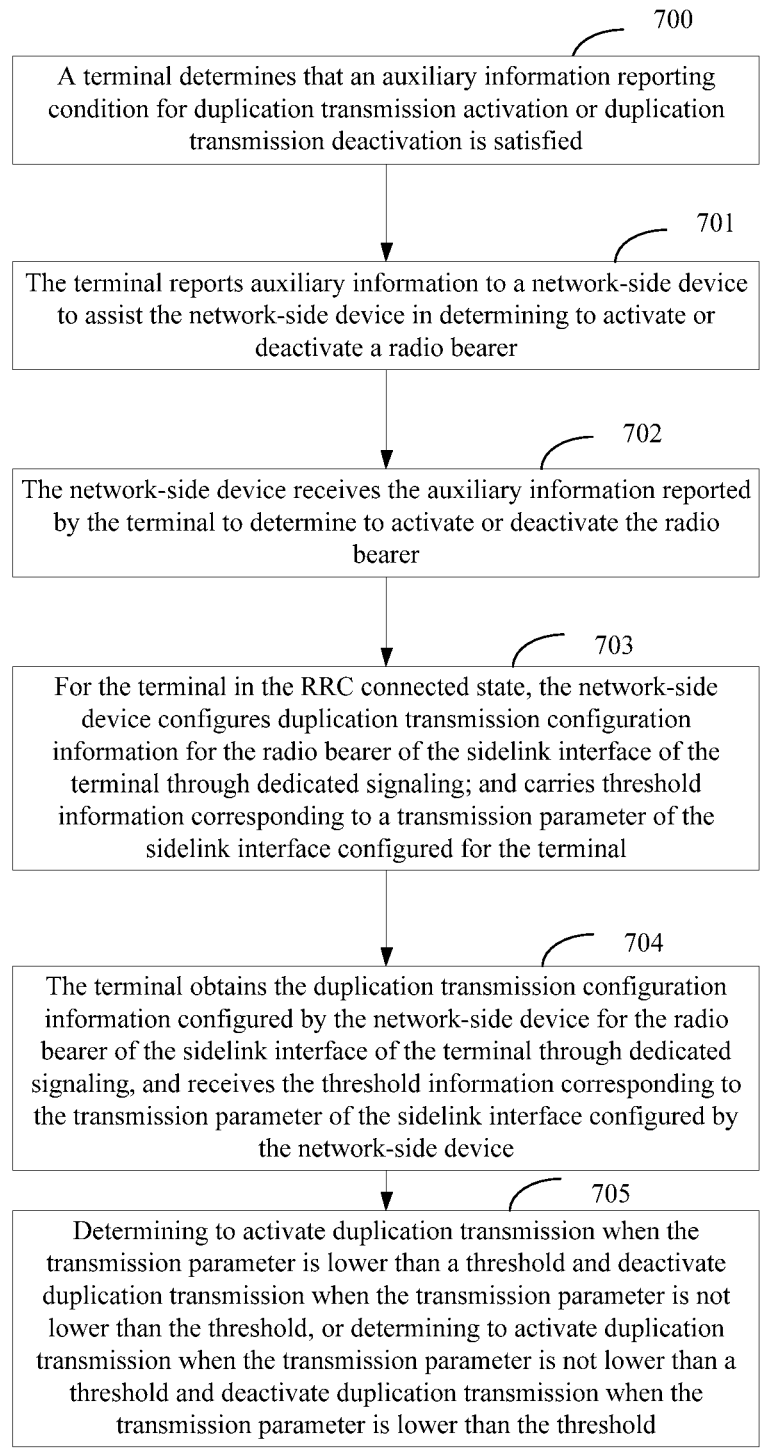
FIG. 7 is a schematic flowchart of a third method for sidelink interface duplication transmission for a terminal in the RRC connected state according to an embodiment of the present application.

As shown in FIG. 7, the implementation process is as follows.

Step 700: a terminal determines that an auxiliary information reporting condition for duplication transmission activation or duplication transmission deactivation is satisfied.

Step 701: the terminal reports auxiliary information to a network-side device to assist the network-side device in determining to activate or deactivate a radio bearer.

Here, steps 700 and 701 are steps, according to one embodiment.

Step 702: the network-side device receives the auxiliary information reported by the terminal to determine to activate or deactivate the radio bearer.

In one embodiment, the network-side device may autonomously determine to activate or deactivate the radio bearer.

Step 703: for the terminal in the RRC connected state, the network-side device configures duplication transmission configuration information for the radio bearer of the sidelink interface of the terminal through an RRC layer dedicated signaling; and carries threshold information corresponding to a transmission parameter of the sidelink interface configured for the terminal.

The threshold information is used to enable the terminal to determine to activate duplication transmission when the transmission parameter is lower than a threshold or deactivate duplication transmission when the transmission parameter is not lower than the threshold.

Step 704: the terminal obtains the duplication transmission configuration information configured by the network-side device for the radio bearer of the sidelink interface of the terminal through an RRC layer dedicated signaling, and receives the threshold information corresponding to the transmission parameter of the sidelink interface configured by the network-side device.

Step 705: determining to activate duplication transmission when the transmission parameter is lower than a threshold and deactivate duplication transmission when the transmission parameter is not lower than the threshold, or determining to activate duplication transmission when the transmission parameter is not lower than a threshold and deactivate duplication transmission when the transmission parameter is lower than the threshold.

Embodiment 5: a method for sidelink interface duplication transmission for a terminal in the RRC idle state or RRC inactive state is as follows.

Figure 8:
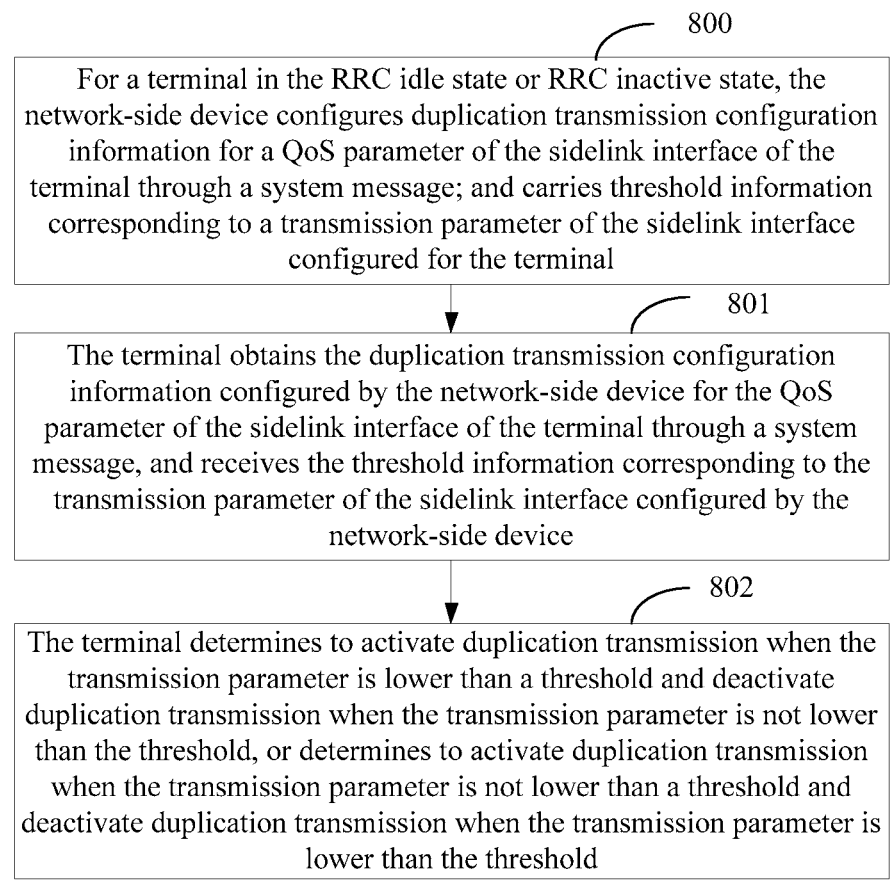
FIG. 8 is a schematic flowchart of a method for sidelink interface duplication transmission for a terminal in a RRC idle state or RRC inactive state according to an embodiment of the present application.

As shown in FIG. 8, the implementation process is as follows.

Step 800: for a terminal in the RRC idle state or RRC inactive state, the network-side device configures duplication transmission configuration information for a QoS parameter of the sidelink interface of the terminal through a system message; and carries threshold information corresponding to a transmission parameter of the sidelink interface configured for the terminal.

The threshold information is used to enable the terminal to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

In one embodiment, the signaling carrying the threshold information may be a piece of signaling same as the signaling in which the network-side device configures the duplication transmission configuration information for the terminal, or may be a single piece of signaling.

Step 801: the terminal obtains the duplication transmission configuration information configured by the network-side device for the QoS parameter of the sidelink interface of the terminal through a system message, and receives the threshold information corresponding to the transmission parameter of the sidelink interface configured by the network-side device.

Step 802: the terminal determines to activate duplication transmission when the transmission parameter is lower than a threshold and deactivate duplication transmission when the transmission parameter is not lower than the threshold, or determines to activate duplication transmission when the transmission parameter is not lower than a threshold and deactivate duplication transmission when the transmission parameter is lower than the threshold.

Embodiment 6: a method for sidelink interface duplication transmission for a terminal in the offline state is as follows.

Figure 9:
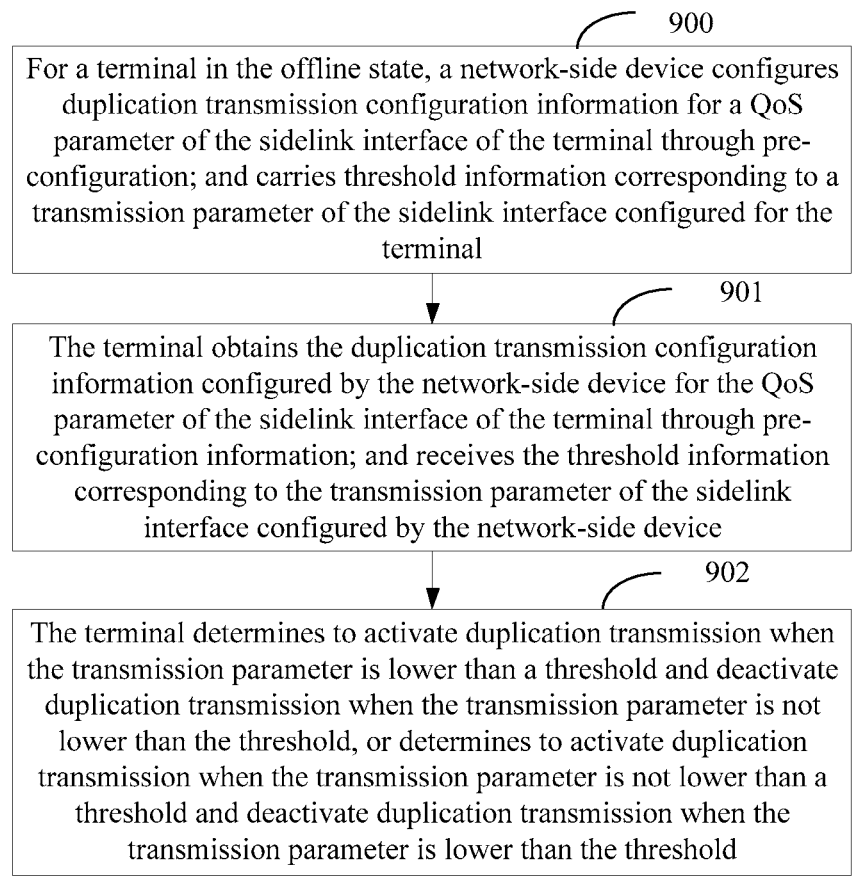
FIG. 9 is a schematic flowchart of a method for sidelink interface duplication transmission for a terminal in an offline state according to an embodiment of the present application.

As shown in FIG. 9, the implementation process is as follows.

Step 900: for a terminal in the offline state, a network-side device configures duplication transmission configuration information for a QoS parameter of the sidelink interface of the terminal through pre-configuration; and carries threshold information corresponding to a transmission parameter of the sidelink interface configured for the terminal.

The threshold information is used to enable the terminal to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

Step 901: the terminal obtains the duplication transmission configuration information configured by the network-side device for the QoS parameter of the sidelink interface of the terminal through pre-configuration information; and receives the threshold information corresponding to the transmission parameter of the sidelink interface configured by the network-side device.

Step 902: the terminal determines to activate duplication transmission when the transmission parameter is lower than a threshold and deactivate duplication transmission when the transmission parameter is not lower than the threshold, or determines to activate duplication transmission when the transmission parameter is not lower than a threshold and deactivate duplication transmission when the transmission parameter is lower than the threshold.

Embodiment 7: a method for sidelink interface duplication transmission applied to the terminal side will be illustrated below.

Figure 10:
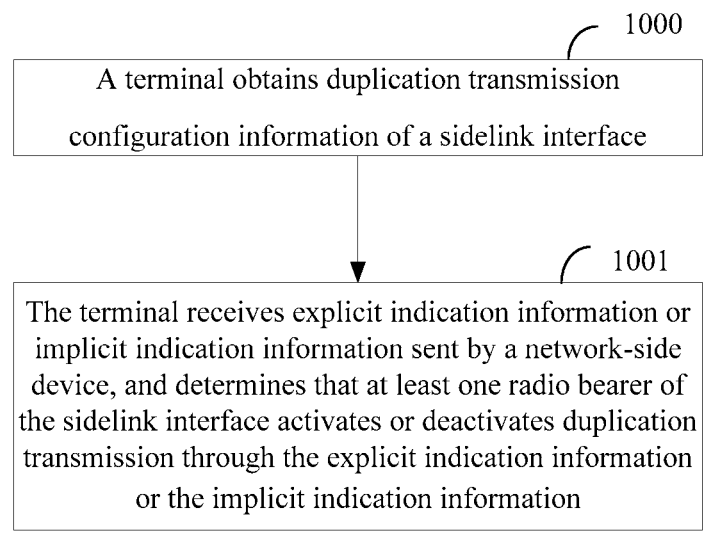
FIG. 10 is a schematic flowchart of a method for sidelink interface duplication transmission at a terminal according to an embodiment of the present application.

An embodiment of the present application provides a method for sidelink interface duplication transmission. As shown in FIG. 10, the method includes following steps.

Step 1000: a terminal obtains duplication transmission configuration information of a sidelink interface.

Step 1001: the terminal receives explicit indication information or implicit indication information sent by a network-side device, and determines that at least one radio bearer of the sidelink interface activates or deactivates duplication transmission through the explicit indication information or the implicit indication information.

In an embodiment, due to different states of the terminal, there are different modes in which the terminal obtains the duplication transmission configuration information of the sidelink interface, where the states of the terminal include but not limited to: RRC connected state; RRC idle state; RRC inactive state; offline state.

In an embodiment, the modes in which the terminal obtains the duplication transmission configuration information of the sidelink interface includes any one or more of following modes.

In a first mode: obtaining the duplication transmission configuration information configured by the network-side device for the radio bearer of the sidelink interface of the terminal through an RRC layer dedicated signaling for the terminal in the RRC connected state.

In the first mode in which the terminal obtains the duplication transmission configuration information of the sidelink interface provided in this embodiment, the duplication transmission configuration information includes any one or more of: a source identifier of the sidelink interface, for example, Source L2 ID; a destination identifier of the sidelink interface, for example, destination L2 ID; a radio bearer identifier of the radio bearer of the sidelink interface; an identifier of a logical channel used for duplication transmission; an identifier of a carrier or BWP corresponding to each logical channel used for duplication transmission.

In a second mode: obtaining the duplication transmission configuration information configured by the network-side device for a QoS parameter of the sidelink interface of the terminal through a system message for the terminal in the RRC idle state or RRC inactive state.

In the second mode in which the terminal obtains the duplication transmission configuration information of the sidelink interface provided in this embodiment, the duplication transmission configuration information includes any one or more of: a source identifier of the sidelink interface, for example, Source L2 ID; a destination identifier of the sidelink interface, for example, destination L2 ID; a QoS identifier of the sidelink interface; an identifier of a logical channel used for duplication transmission; an identifier of a carrier or BWP corresponding to each logical channel used for duplication transmission.

In a third mode: obtaining the duplication transmission configuration information configured for a QoS parameter of the sidelink interface of the terminal through pre-configuration information for the terminal in the offline state.

In the third mode in which the terminal obtains the duplication transmission configuration information of the sidelink interface provided in this embodiment, the duplication transmission configuration information includes any one or more of: a source identifier of the sidelink interface, for example, Source L2 ID; a destination identifier of the sidelink interface, for example, destination L2 ID; a QoS identifier of the sidelink interface; an identifier of a logical channel used for duplication transmission; an identifier of a carrier or BWP corresponding to each logical channel used for duplication transmission.

Firstly, the process of explicitly controlling to activate or deactivate duplication transmission will be illustrated.

The mode in which the terminal receives the explicit indication information sent by the network-side device and determines that the radio bearer of the sidelink interface activates or deactivates duplication transmission through the explicit indication information includes any one of following modes.

Mode 1: the terminal receives the duplication transmission configuration information carrying a radio bearer identifier of the sidelink interface sent by the network-side device through RRC layer dedicated signaling, and determines that the radio bearer of the sidelink interface activates duplication transmission.

Mode 2: the terminal receives the duplication transmission configuration information carrying a radio bearer identifier of the sidelink interface sent by the network-side device through RRC layer dedicated signaling in which the radio bearer identifier is defaulted, and determines that the radio bearer of the sidelink interface deactivates duplication transmission.

Mode 3: the terminal receives the duplication transmission configuration information carrying a radio bearer identifier of the sidelink interface sent by the network-side device through RRC layer dedicated signaling, where the duplication transmission configuration information includes a duplication transmission activation identifier for the radio bearer; and determines that the radio bearer of the sidelink interface activates duplication transmission.

Mode 4: the terminal receives the duplication transmission configuration information carrying a radio bearer identifier of the sidelink interface sent by the network-side device through RRC layer dedicated signaling, where the duplication transmission configuration information includes a duplication transmission deactivation identifier for the radio bearer; and determines that the radio bearer of the sidelink interface deactivates duplication transmission.

Mode 5: the terminal receives an MAC CE for controlling duplication transmission activation and/or deactivation of the sidelink interface, and determines that the radio bearer of the sidelink interface activates duplication transmission according to activation indication information corresponding to the radio bearer of the sidelink interface carried by the MAC CE.

In the mode 5, the MAC CE for controlling duplication transmission activation of the sidelink interface may include any one of following contents.

Content 501: communication interface indication information corresponding to the MAC CE, and activation state indication information corresponding to all radio bearers configured with duplication transmission on the communication interface are included in the MAC CE for controlling duplication transmission activation of the sidelink interface.

Content 502: communication interface indication information corresponding to the MAC CE, and activation state indication information of all logical channels corresponding to each of all radio bearers configured with duplication transmission on the communication interface are included in the MAC CE for controlling duplication transmission activation of the sidelink interface.

Content 503: communication interface indication information corresponding to the MAC CE, a source identifier of the sidelink interface, a destination identifier of the sidelink interface, and activation state indication information corresponding to all radio bearers of the sidelink interface with the source and destination identifiers and configured with duplication transmission are included in the MAC CE for controlling duplication transmission activation of the sidelink interface.

In the cases of 501 to 503 above, if the MAC CE corresponds to radio bearers of the sidelink interface, the activation state indication information corresponding to all radio bearers of the sidelink interface configured with duplication transmission on the communication interface is arranged in the MAC CE according to identifiers of the radio bearers of the sidelink interface.

Content 504: communication interface indication information corresponding to the MAC CE, a source identifier of the sidelink interface, a destination identifier of the sidelink interface, and activation state indication information of all logical channels corresponding to each of all radio bearers of the sidelink interface with the source and destination identifiers and configured with duplication transmission are included in the MAC CE for controlling duplication transmission activation of the sidelink interface.

In the above case of 504, if any radio bearer of the sidelink interface corresponding to the MAC CE corresponds to logical channels, the activation state indication information of all logical channels corresponding to each of all radio bearers of the sidelink interface configured with duplication transmission on the communication interface is arranged in the MAC CE according to identifiers of the logical channels.

If the MAC CE corresponds to radio bearers of the sidelink interface, and if any radio bearer of the sidelink interface corresponding to the MAC CE corresponds to logical channels, then the following case occurs: the activation state indication information corresponding to all radio bearers of the sidelink interface configured with duplication transmission on the communication interface is arranged in the MAC CE according to identifiers of the radio bearers of the sidelink interface; and the activation state indication information of all logical channels corresponding to each of all radio bearers of the sidelink interface configured with duplication transmission on the communication interface is arranged in the MAC CE according to identifiers of the logical channels.

Mode 6: the terminal receives an MAC CE for controlling duplication transmission activation and/or deactivation of the sidelink interface, and determines that the radio bearer of the sidelink interface deactivates duplication transmission according to deactivation indication information corresponding to the radio bearer of the sidelink interface carried by the MAC CE.

In the mode 6, the MAC CE for controlling duplication transmission deactivation of the sidelink interface may include any one of following contents.

Content 601: the communication interface indication information corresponding to the MAC CE, and the deactivation state indication information corresponding to all radio bearers configured with duplication transmission on the communication interface are included in the MAC CE for controlling duplication transmission deactivation of the sidelink interface.

Content 602: the communication interface indication information corresponding to the MAC CE, and the deactivation state indication information of all logical channels corresponding to each of all radio bearers configured with duplication transmission on the communication interface are included in the MAC CE for controlling duplication transmission deactivation of the sidelink interface.

Content 603: the communication interface indication information corresponding to the MAC CE, a source identifier of the sidelink interface, a destination identifier of the sidelink interface, and the deactivation state indication information corresponding to all radio bearers of the sidelink interface with the source and destination identifiers and configured with duplication transmission are included in the MAC CE for controlling duplication transmission deactivation of the sidelink interface.

In the above cases of 601 to 603, if the MAC CE corresponds to radio bearers of the sidelink interface, the deactivation state indication information corresponding to all radio bearers of the sidelink interface configured with duplication transmission on the communication interface is arranged in the MAC CE according to identifiers of the radio bearers of the sidelink interface.

Content 604: the communication interface indication information corresponding to the MAC CE, a source identifier of the sidelink interface, a destination identifier of the sidelink interface, and the deactivation state indication information of all logical channels corresponding to each of all radio bearers of the sidelink interface with the source and destination identifiers and configured with duplication transmission are included in the MAC CE for controlling duplication transmission deactivation of the sidelink interface.

In the above case of 604, if any radio bearer of the sidelink interface corresponding to the MAC CE corresponds to logical channels, the deactivation state indication information of all logical channels corresponding to each of all radio bearers of the sidelink interface configured with duplication transmission on the communication interface is arranged in the MAC CE according to identifiers of the logical channels.

If the MAC CE corresponds to radio bearers of the sidelink interface, and if any radio bearer of the sidelink interface corresponding to the MAC CE corresponds to logical channels, then the following case occurs: the deactivation state indication information corresponding to all radio bearers of the sidelink interface configured with duplication transmission on the communication interface is arranged in the MAC CE according to identifiers of the radio bearers of the sidelink interface; and the deactivation state indication information of all logical channels corresponding to each of all radio bearers of the sidelink interface configured with duplication transmission on the communication interface is arranged in the MAC CE according to identifiers of the logical channels.

As a possible implementation, the communication interface indication information corresponding to the MAC CE is located in an MAC subheader or MAC CE payload of the MAC CE.

Secondly, the process of implicitly controlling to activate or deactivate duplication transmission will be illustrated.

The terminal receives the implicit indication information sent by the network-side device and determines that the radio bearer of the sidelink interface activates or deactivates duplication transmission through the implicit indication information in a following manner.

The terminal receives threshold information corresponding to a transmission parameter of the sidelink interface configured by the network-side device, to determine to activate duplication transmission when the transmission parameter is lower than a threshold and deactivate duplication transmission when the transmission parameter is not lower than the threshold.

In this embodiment, the configured threshold information includes any one or more of: threshold information configured based on the radio bearer of the sidelink interface; threshold information configured based on source and destination identifiers of the sidelink interface; threshold information configured based on a QoS parameter.

In an embodiment, the transmission parameter of the sidelink interface includes any one or more of: channel quality of the sidelink interface; signal strength of the sidelink interface; or a quantity of times the sidelink interface continuously receives HARQ NACK feedback; data packet waiting time of the radio bearer of the sidelink interface.

In one embodiment, the terminal reports auxiliary information to the network-side device to assist the network-side device in determining to activate or deactivate the radio bearer when determining that an auxiliary information reporting condition for duplication transmission activation or duplication transmission deactivation is satisfied.

If the network-side device needs the auxiliary information reported by the terminal to assist the network-side device in determining to activate or deactivate the radio bearer, the network-side device may activate or deactivate the radio bearer after receiving the auxiliary information reported by the terminal. But, if the network-side device does not need the auxiliary information of the terminal, the network-side device may autonomously make a determination to activate or deactivate the radio bearer, and the specific algorithm depends on the implementation mode of the network-side device.

As a possible implementation, the process of determining that the auxiliary information reporting condition for duplication transmission activation is satisfied includes any one of following activation conditions.

Activation condition 1: the terminal determines that the auxiliary information reporting condition for duplication transmission activation is satisfied when determining that the channel quality or signal strength of the sidelink interface is lower than a threshold.

Activation condition 2: the terminal determines that the auxiliary information reporting condition for duplication transmission activation is satisfied when determining that data packet waiting time of the radio bearer of the sidelink interface with duplication transmission is greater than a threshold.

Activation condition 3: the terminal determines that the auxiliary information reporting condition for duplication transmission activation is satisfied when determining that a quantity of times the sidelink interface continuously receives HARQ NACK feedback is greater than a threshold.

As a possible implementation, the process of determining that the auxiliary information reporting condition for duplication transmission deactivation is satisfied includes any one of following deactivation conditions.

Deactivation condition 1: determining that the auxiliary information reporting condition for duplication transmission deactivation is satisfied when determining that the channel quality or signal strength of the sidelink interface is not lower than a threshold.

Deactivation condition 2: determining that the auxiliary information reporting condition for duplication transmission deactivation is satisfied when determining that data packet waiting time of the radio bearer of the sidelink interface with duplication transmission is not greater than a threshold.

Deactivation condition 3: determining that the auxiliary information reporting condition for duplication transmission deactivation is satisfied when determining that a quantity of times the sidelink interface continuously receives HARQ NACK feedback is not greater than a threshold.

In one embodiment, the auxiliary information includes any one or more of: auxiliary information 1: source identifier information of the sidelink interface, for example, Source L2 ID; auxiliary information 2: destination identifier information of the sidelink interface, for example, destination L2 ID; auxiliary information 3: identifier information of the radio bearer of the sidelink interface; auxiliary information 4: identifier information of the radio bearer of the sidelink interface that exceeds a set threshold of data packet waiting time; auxiliary information 5: identifier information that a set quantity of HARQ NACK feedbacks are continuously received.

Here, the identifier information of the radio bearer in the auxiliary information 3 and the auxiliary information 4 includes any one of: identifier 1: an identifier of the radio bearer of the sidelink interface; identifier 2: a logical channel identifier LCID of the radio bearer of the sidelink interface; identifier 3: a source identifier of the sidelink interface, a destination identifier of the sidelink interface, and an identifier of the radio bearer of the sidelink interface; for example, the identifier information is: a source identifier of the sidelink interface+a destination identifier of the sidelink interface+an identifier of the radio bearer of the sidelink interface; identifier 4: a source identifier of the sidelink interface, a destination identifier of the sidelink interface, and a logical channel identifier of the sidelink interface; for example, the identifier information is: a source identifier of the sidelink interface+a destination identifier of the sidelink interface+a logical channel identifier of the sidelink interface; identifier 5: a source identifier of the sidelink interface, a destination identifier of the sidelink interface, a communication type identifier of the sidelink interface, and an identifier of the radio bearer of the sidelink interface; for example, the identifier information is: a source identifier of the sidelink interface+a destination identifier of the sidelink interface+a communication type identifier of the sidelink interface+an identifier of the radio bearer of the sidelink interface; identifier 6: a source identifier of the sidelink interface, a destination identifier of the sidelink interface, a communication type identifier of the sidelink interface, and a logical channel identifier of the sidelink interface; for example, the identification information is: a source identifier of the sidelink interface+a destination identifier of the sidelink interface+a communication type identifier of the sidelink interface+a logical channel identifier of the sidelink interface.

Embodiment 8: a method for sidelink interface duplication transmission applied to the network-side device will be illustrated below.

Figure 11:
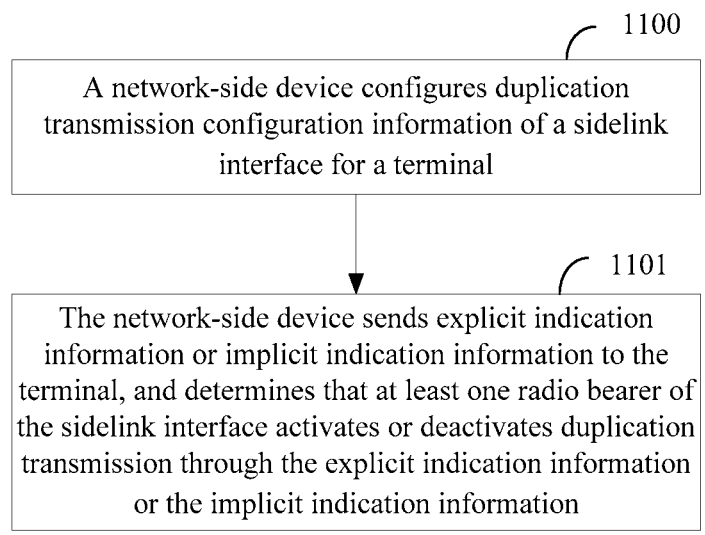
FIG. 11 is a schematic flowchart of a method for sidelink interface duplication transmission at a network-side device according to an embodiment of the present application.

An embodiment of the present application provides a method for sidelink interface duplication transmission. As shown in FIG. 11, the method includes following steps.

Step 1100: a network-side device configures duplication transmission configuration information of a sidelink interface for a terminal.

Step 1101: the network-side device sends explicit indication information or implicit indication information to the terminal, and determines that at least one radio bearer of the sidelink interface activates or deactivates duplication transmission through the explicit indication information or the implicit indication information.

In an embodiment, due to different states of the terminal, there are different modes in which the network-side device configures the duplication transmission configuration information of the sidelink interface for the terminal, where the states of the terminal include but not limited to: RRC connected state; RRC idle state; RRC inactive state; offline state.

In an embodiment, the modes in which the network-side device configures the duplication transmission configuration information of the sidelink interface for the terminal include any one of following modes.

In a first mode: for the terminal in the RRC connected state, the network-side device configures the duplication transmission configuration information for the radio bearer of the sidelink interface of the terminal through an RRC layer dedicated signaling.

In the first mode, the duplication transmission configuration information includes any one or more of: a source identifier of the sidelink interface; a destination identifier of the sidelink interface; a radio bearer identifier of the radio bearer of the sidelink interface; an identifier of a logical channel used for duplication transmission; an identifier of a carrier or BWP corresponding to each logical channel used for duplication transmission.

In a second mode: for the terminal in the RRC idle state or RRC inactive state, the network-side device configures the duplication transmission configuration information for a QoS parameter of the sidelink interface of the terminal through a system message.

In the second mode, the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

In a third mode: for the terminal in the offline state, the network-side device configures the duplication transmission configuration information for a QoS parameter of the sidelink interface of the terminal through pre-configuration.

In the third mode, the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

In an embodiment, the network-side device may control the radio bearer of the sidelink interface to activate or deactivate duplication transmission in an explicit or implicit manner.

Firstly, the method in which the network-side device explicitly controls the radio bearer of the sidelink interface to activate or deactivate duplication transmission will be illustrated.

The mode in which the network-side device sends the explicit indication information to the terminal and determines that the radio bearer of the sidelink interface activates or deactivates duplication transmission through the explicit indication information includes any one of following modes.

Mode 1: the network-side device sends the duplication transmission configuration information carrying a radio bearer identifier of the sidelink interface to the terminal through RRC layer dedicated signaling, and determines that the radio bearer of the sidelink interface activates duplication transmission.

Mode 2: the network-side device sends the duplication transmission configuration information carrying a radio bearer identifier of the sidelink interface to the terminal through RRC layer dedicated signaling in which the radio bearer identifier is defaulted, and determines that the radio bearer of the sidelink interface deactivates duplication transmission.

Mode 3: the network-side device sends the duplication transmission configuration information carrying a radio bearer identifier of the sidelink interface to the terminal through RRC layer dedicated signaling, where the duplication transmission configuration information includes a duplication transmission activation identifier for the radio bearer; and determines that the radio bearer of the sidelink interface activates duplication transmission.

Mode 4: the network-side device sends the duplication transmission configuration information carrying a radio bearer identifier of the sidelink interface to the terminal through RRC layer dedicated signaling, where the duplication transmission configuration information includes a duplication transmission deactivation identifier for the radio bearer; and determines that the radio bearer of the sidelink interface deactivates duplication transmission.

Mode 5: the network-side device determines that the radio bearer of the sidelink interface activates duplication transmission through activation indication information corresponding to the radio bearer of the sidelink interface carried by an MAC CE for controlling duplication transmission activation and/or deactivation of the sidelink interface.

Mode 6: the network-side device determines that the radio bearer of the sidelink interface deactivates duplication transmission through deactivation indication information corresponding to the radio bearer of the sidelink interface carried by an MAC CE for controlling duplication transmission activation and/or deactivation of the sidelink interface.

In one embodiment, the MAC CE for controlling duplication transmission activation and/or deactivation of the sidelink interface includes: communication interface indication information corresponding to the MAC CE, and activation and/or deactivation state indication information corresponding to all radio bearers configured with duplication transmission on the communication interface; or communication interface indication information corresponding to the MAC CE, and activation and/or deactivation state indication information of all logical channels corresponding to each of all radio bearers configured with duplication transmission on the communication interface; or communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

In one embodiment, when the MAC CE corresponds to radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or when any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE according to identifiers of the logical channels.

In one embodiment, the communication interface indication information corresponding to the MAC CE is located in an MAC subheader or MAC CE payload of the MAC CE.

Secondly, the method in which the network-side device implicitly controls the radio bearer of the sidelink interface to activate or deactivate duplication transmission will be illustrated.

The step in which the network-side device sends the implicit indication information to the terminal and determines that the radio bearer of the sidelink interface activates or deactivates duplication transmission through the implicit indication information, includes: the network-side device configures threshold information corresponding to a transmission parameter of the sidelink interface for the terminal, so that the terminal determines to activate duplication transmission when the transmission parameter is lower than a threshold and deactivate duplication transmission when the transmission parameter is not lower than the threshold, or determines to activate duplication transmission when the transmission parameter is not lower than a threshold and deactivate duplication transmission when the transmission parameter is lower than the threshold.

In one embodiment, the configured threshold information includes any one or more of: threshold information configured based on the radio bearer of the sidelink interface; threshold information configured based on source and destination identifiers of the sidelink interface; threshold information configured based on a QoS parameter.

In one embodiment, duplication transmission is determined to be activated when the transmission parameter is lower than a threshold and duplication transmission is determined to be deactivated when the transmission parameter is not lower than the threshold, and the transmission parameter of the sidelink interface includes any one or more of: channel quality of the sidelink interface; signal strength of the sidelink interface; or duplication transmission is determined to be activated when the transmission parameter is not lower than a threshold and duplication transmission is determined to be deactivated when the transmission parameter is lower than the threshold, and the transmission parameter of the sidelink interface includes any one or more of: a quantity of times the sidelink interface continuously receives HARQ NACK feedback; data packet waiting time of the radio bearer of the sidelink interface.

In one embodiment, the method further includes: the network-side device receives auxiliary information reported by the terminal to determine to activate or deactivate the radio bearer.

In one embodiment, the auxiliary information includes any one or more of: source identifier information of the sidelink interface; destination identifier information of the sidelink interface; identifier information of the radio bearer of the sidelink interface; identifier information of the radio bearer of the sidelink interface that exceeds a set threshold of data packet waiting time; identifier information that a set quantity of HARQ NACK feedbacks are continuously received.

In one embodiment, the identifier information of the radio bearer includes any one or more of: an identifier of the radio bearer of the sidelink interface; a logical channel identifier of the radio bearer of the sidelink interface; a source identifier of the sidelink interface, a destination identifier of the sidelink interface, and an identifier of the radio bearer of the sidelink interface; a source identifier of the sidelink interface, a destination identifier of the sidelink interface, and a logical channel identifier of the sidelink interface; a source identifier of the sidelink interface, a destination identifier of the sidelink interface, a communication type identifier of the sidelink interface, and an identifier of the radio bearer of the sidelink interface; a source identifier of the sidelink interface, a destination identifier of the sidelink interface, a communication type identifier of the sidelink interface, and a logical channel identifier of the sidelink interface.

Embodiment 9: based on the same embodiments, an embodiment of the present application further provides a terminal for sidelink interface duplication transmission. Since this terminal is a terminal for data processing in embodiments of the present application and the principle of this terminal to solve the problem is similar to that of the method, the implementations of this terminal can refer to the implementations of the method, and the repeated description thereof will be omitted here.

Figure 12:
FIG. 12 is a structural schematic diagram of a terminal for sidelink interface duplication transmission according to an embodiment of the present application.

As shown in FIG. 12, an embodiment of the present application further provides a terminal for sidelink interface duplication transmission, including a processor 1200 and a memory 1201, where the memory is configured to store a program executable by the processor, and the processor is configured to read the program in the memory and perform: obtaining duplication transmission configuration information of a sidelink interface; receiving explicit indication information or implicit indication information sent by a network-side device, and determining that at least one radio bearer of the sidelink interface activates or deactivates duplication transmission through the explicit indication information or the implicit indication information.

As a possible implementation, the processor is configured to: obtain the duplication transmission configuration information configured by the network-side device for the radio bearer of the sidelink interface of the terminal through an RRC layer dedicated signaling for the terminal in an RRC connected state; or obtain the duplication transmission configuration information configured by the network-side device for a QoS parameter of the sidelink interface of the terminal through a system message for the terminal in an RRC idle state or RRC inactive state; or obtain the duplication transmission configuration information configured for a QoS parameter of the sidelink interface of the terminal through pre-configuration information for the terminal in an offline state.

As a possible implementation, the duplication transmission configuration information configured by the network-side device for the radio bearer of the sidelink interface of the terminal is obtained through the RRC layer dedicated signaling for the terminal in the RRC connected state, and the duplication transmission configuration information includes any one or more of: a source identifier of the sidelink interface; a destination identifier of the sidelink interface; a radio bearer identifier of the radio bearer of the sidelink interface; an identifier of a logical channel used for duplication transmission; an identifier of a carrier or BWP corresponding to each logical channel used for duplication transmission.

As a possible implementation, the duplication transmission configuration information configured by the network-side device for the QoS parameter of the sidelink interface of the terminal is obtained through the system message for the terminal in the RRC idle state or RRC inactive state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission; the duplication transmission configuration information configured for the QoS parameter of the sidelink interface of the terminal is obtained through the pre-configuration information for the terminal in the offline state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

As a possible implementation, the processor is configured to: receive the duplication transmission configuration information carrying a radio bearer identifier of the sidelink interface sent by the network-side device through RRC layer dedicated signaling, and determine that the radio bearer of the sidelink interface activates duplication transmission; or receive the duplication transmission configuration information carrying a radio bearer identifier of the sidelink interface sent by the network-side device through RRC layer dedicated signaling in which the radio bearer identifier is defaulted, and determine that the radio bearer of the sidelink interface deactivates duplication transmission; or receive the duplication transmission configuration information carrying a radio bearer identifier of the sidelink interface sent by the network-side device through RRC layer dedicated signaling, where the duplication transmission configuration information includes a duplication transmission activation identifier for the radio bearer; and determine that the radio bearer of the sidelink interface activates duplication transmission; or receive the duplication transmission configuration information carrying a radio bearer identifier of the sidelink interface sent by the network-side device through RRC layer dedicated signaling, where the duplication transmission configuration information includes a duplication transmission deactivation identifier for the radio bearer; and determine that the radio bearer of the sidelink interface deactivates duplication transmission; or receive an MAC CE for controlling duplication transmission activation and/or deactivation of the sidelink interface, and determine that the radio bearer of the sidelink interface activates duplication transmission according to activation indication information corresponding to the radio bearer of the sidelink interface carried by the MAC CE; or receive an MAC CE for controlling duplication transmission activation and/or deactivation of the sidelink interface, and determine that the radio bearer of the sidelink interface deactivates duplication transmission according to deactivation indication information corresponding to the radio bearer of the sidelink interface carried by the MAC CE.

As a possible implementation, the MAC CE for controlling duplication transmission activation and/or deactivation of the sidelink interface includes: communication interface indication information corresponding to the MAC CE, and activation and/or deactivation state indication information corresponding to all radio bearers configured with duplication transmission on the communication interface; or communication interface indication information corresponding to the MAC CE, and activation and/or deactivation state indication information of all logical channels corresponding to each of all radio bearers configured with duplication transmission on the communication interface; or communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

As a possible implementation, when the MAC CE corresponds to radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or when any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE according to identifiers of the logical channels.

As a possible implementation, the communication interface indication information corresponding to the MAC CE is located in an MAC subheader or MAC CE payload of the MAC CE.

As a possible implementation, the processor is configured to: receive threshold information corresponding to a transmission parameter of the sidelink interface configured by the network-side device, to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

As a possible implementation, the configured threshold information includes any one or more of: threshold information configured based on the radio bearer of the sidelink interface; threshold information configured based on source and destination identifiers of the sidelink interface; threshold information configured based on a QoS parameter.

As a possible implementation, duplication transmission is determined to be activated when the transmission parameter is lower than the threshold and duplication transmission is determined to be deactivated when the transmission parameter is not lower than the threshold, and the transmission parameter of the sidelink interface includes any one or more of: channel quality of the sidelink interface; signal strength of the sidelink interface; or duplication transmission is determined to be activated when the transmission parameter is not lower than the threshold and duplication transmission is determined to be deactivated when the transmission parameter is lower than the threshold, and the transmission parameter of the sidelink interface includes any one or more of: a quantity of times the sidelink interface continuously receives HARQ NACK feedback; data packet waiting time of the radio bearer of the sidelink interface.

As a possible implementation, the processor is further configured to: report auxiliary information to the network-side device to assist the network-side device in determining to activate or deactivate the radio bearer when determining that an auxiliary information reporting condition for duplication transmission activation or duplication transmission deactivation is satisfied.

As a possible implementation, the processor is configured to: determine that the auxiliary information reporting condition for duplication transmission activation is satisfied when determining that channel quality or signal strength of the sidelink interface is lower than a threshold; or determine that the auxiliary information reporting condition for duplication transmission activation is satisfied when determining that data packet waiting time of the radio bearer of the sidelink interface with duplication transmission is greater than a threshold; or determine that the auxiliary information reporting condition for duplication transmission activation is satisfied when determining that a quantity of times the sidelink interface continuously receives HARQ NACK feedback is greater than a threshold.

As a possible implementation, the processor is configured to: determine that the auxiliary information reporting condition for duplication transmission deactivation is satisfied when determining that channel quality or signal strength of the sidelink interface is not lower than a threshold; or determine that the auxiliary information reporting condition for duplication transmission deactivation is satisfied when determining that data packet waiting time of the radio bearer of the sidelink interface with duplication transmission is not greater than a threshold; or determine that the auxiliary information reporting condition for duplication transmission deactivation is satisfied when determining that a quantity of times the sidelink interface continuously receives HARQ NACK feedback is not greater than a threshold.

As a possible implementation, the auxiliary information includes any one or more of: source identifier information of the sidelink interface; destination identifier information of the sidelink interface; identifier information of the radio bearer of the sidelink interface; identifier information of the radio bearer of the sidelink interface that exceeds a set threshold of data packet waiting time; identifier information that a set quantity of HARQ NACK feedbacks are continuously received.

As a possible implementation, the identifier information of the radio bearer includes any one of: an identifier of the radio bearer of the sidelink interface; a logical channel identifier of the radio bearer of the sidelink interface; a source identifier of the sidelink interface, a destination identifier of the sidelink interface, and an identifier of the radio bearer of the sidelink interface; a source identifier of the sidelink interface, a destination identifier of the sidelink interface, and a logical channel identifier of the sidelink interface; a source identifier of the sidelink interface, a destination identifier of the sidelink interface, a communication type identifier of the sidelink interface, and an identifier of the radio bearer of the sidelink interface; a source identifier of the sidelink interface, a destination identifier of the sidelink interface, a communication type identifier of the sidelink interface, and a logical channel identifier of the sidelink interface.

Embodiment 10: based on the same embodiments, an embodiment of the present application further provides a network-side device for sidelink interface duplication transmission. Since this device is a receiving device for data processing in embodiments of the present application and the principle of this device to solve the problem is similar to that of the method, the implementations of this device can refer to the implementations of the method, and the repeated description thereof will be omitted here.

Figure 13:
FIG. 13 is a structural schematic diagram of a network-side device for sidelink interface duplication transmission according to an embodiment of the present application.

As shown in FIG. 13, an embodiment of the present application further provides a network-side device for sidelink interface duplication transmission, including a processor 1300 and a memory 1301, where the memory is configured to store a program executable by the processor, and the processor is configured to read the program in the memory and perform: configuring duplication transmission configuration information of a sidelink interface for a terminal; sending explicit indication information or implicit indication information to the terminal, and determining that at least one radio bearer of the sidelink interface activates or deactivates duplication transmission through the explicit indication information or the implicit indication information.

As a possible implementation, the processor is configured to: configure the duplication transmission configuration information for the radio bearer of the sidelink interface of the terminal through an RRC layer dedicated signaling for the terminal in an RRC connected state; or configure the duplication transmission configuration information for a QoS parameter of the sidelink interface of the terminal through a system message for the terminal in an RRC idle state or RRC inactive state; or configure the duplication transmission configuration information for a QoS parameter of the sidelink interface of the terminal through pre-configuration for the terminal in an offline state.

As a possible implementation, the network-side device configures the duplication transmission configuration information for the radio bearer of the sidelink interface of the terminal through the RRC layer dedicated signaling for the terminal in the RRC connected state, and the duplication transmission configuration information includes any one or more of: a source identifier of the sidelink interface; a destination identifier of the sidelink interface; a radio bearer identifier of the radio bearer of the sidelink interface; an identifier of a logical channel used for duplication transmission; an identifier of a carrier or BWP corresponding to each logical channel used for duplication transmission.

As a possible implementation, the network-side device configures the duplication transmission configuration information for the QoS parameter of the sidelink interface of the terminal through the system message for the terminal in the RRC idle state or RRC inactive state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission; the network-side device configures the duplication transmission configuration information for the QoS parameter of the sidelink interface of the terminal through pre-configuration for the terminal in the offline state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

As a possible implementation, the processor is configured to: send the duplication transmission configuration information carrying a radio bearer identifier of the sidelink interface to the terminal through RRC layer dedicated signaling, and determine that the radio bearer of the sidelink interface activates duplication transmission; or send the duplication transmission configuration information carrying a radio bearer identifier of the sidelink interface to the terminal through RRC layer dedicated signaling in which the radio bearer identifier is defaulted, and determine that the radio bearer of the sidelink interface deactivates duplication transmission; or send the duplication transmission configuration information carrying a radio bearer identifier of the sidelink interface to the terminal through RRC layer dedicated signaling, where the duplication transmission configuration information includes a duplication transmission activation identifier for the radio bearer; and determine that the radio bearer of the sidelink interface activates duplication transmission; or send the duplication transmission configuration information carrying a radio bearer identifier of the sidelink interface to the terminal through RRC layer dedicated signaling, where the duplication transmission configuration information includes a duplication transmission deactivation identifier for the radio bearer; and determine that the radio bearer of the sidelink interface deactivates duplication transmission; or determine that the radio bearer of the sidelink interface activates duplication transmission through activation indication information corresponding to the radio bearer of the sidelink interface carried by an MAC CE for controlling duplication transmission activation and/or deactivation of the sidelink interface; or determine that the radio bearer of the sidelink interface deactivates duplication transmission through deactivation indication information corresponding to the radio bearer of the sidelink interface carried by an MAC CE for controlling duplication transmission activation and/or deactivation of the sidelink interface.

As a possible implementation, the MAC CE for controlling duplication transmission activation and/or deactivation of the sidelink interface includes: communication interface indication information corresponding to the MAC CE, and activation and/or deactivation state indication information corresponding to all radio bearers configured with duplication transmission on the communication interface; or communication interface indication information corresponding to the MAC CE, and activation and/or deactivation state indication information of all logical channels corresponding to each of all radio bearers configured with duplication transmission on the communication interface; or communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

As a possible implementation, when the MAC CE corresponds to radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or when any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE according to identifiers of the logical channels.

As a possible implementation, the communication interface indication information corresponding to the MAC CE is located in an MAC subheader or MAC CE payload of the MAC CE.

As a possible implementation, the processor is configured to: configure threshold information corresponding to a transmission parameter of the sidelink interface for the terminal, so that the terminal determines to activate duplication transmission when the transmission parameter is lower than a threshold and deactivate duplication transmission when the transmission parameter is not lower than the threshold, or determines to activate duplication transmission when the transmission parameter is not lower than a threshold and deactivate duplication transmission when the transmission parameter is lower than the threshold.

As a possible implementation, the configured threshold information includes any one or more of: threshold information configured based on the radio bearer of the sidelink interface; threshold information configured based on source and destination identifiers of the sidelink interface; threshold information configured based on a QoS parameter.

As a possible implementation, duplication transmission is determined to be activated when the transmission parameter is lower than the threshold and duplication transmission is determined to be deactivated when the transmission parameter is not lower than the threshold, and the transmission parameter of the sidelink interface includes any one or more of: channel quality of the sidelink interface; signal strength of the sidelink interface; or duplication transmission is determined to be activated when the transmission parameter is not lower than the threshold and duplication transmission is determined to be deactivated when the transmission parameter is lower than the threshold, and the transmission parameter of the sidelink interface includes any one or more of: a quantity of times the sidelink interface continuously receives HARQ NACK feedback; data packet waiting time of the radio bearer of the sidelink interface.

As a possible implementation, the processor is further configured to: receive auxiliary information reported by the terminal to determine to activate or deactivate the radio bearer.

As a possible implementation, the auxiliary information includes any one or more of: source identifier information of the sidelink interface; destination identifier information of the sidelink interface; identifier information of the radio bearer of the sidelink interface; identifier information of the radio bearer of the sidelink interface that exceeds a set threshold of data packet waiting time; identifier information that a set quantity of HARQ NACK feedbacks are continuously received.

As a possible implementation, the identifier information of the radio bearer includes any one or more of: an identifier of the radio bearer of the sidelink interface; a logical channel identifier of the radio bearer of the sidelink interface; a source identifier of the sidelink interface, a destination identifier of the sidelink interface, and an identifier of the radio bearer of the sidelink interface; a source identifier of the sidelink interface, a destination identifier of the sidelink interface, and a logical channel identifier of the sidelink interface; a source identifier of the sidelink interface, a destination identifier of the sidelink interface, a communication type identifier of the sidelink interface, and an identifier of the radio bearer of the sidelink interface; a source identifier of the sidelink interface, a destination identifier of the sidelink interface, a communication type identifier of the sidelink interface, and a logical channel identifier of the sidelink interface.

Embodiment 11: based on the same embodiments, an embodiment of the present application further provides an apparatus for sidelink interface duplication transmission. Since the apparatus is an apparatus that performs sidelink interface duplication transmission in embodiments of the present application and the principle of the apparatus to solve the problem is similar to that of the method, the implementations of the apparatus can refer to the implementations of the method, and the repeated description thereof will be omitted here.

Figure 14:
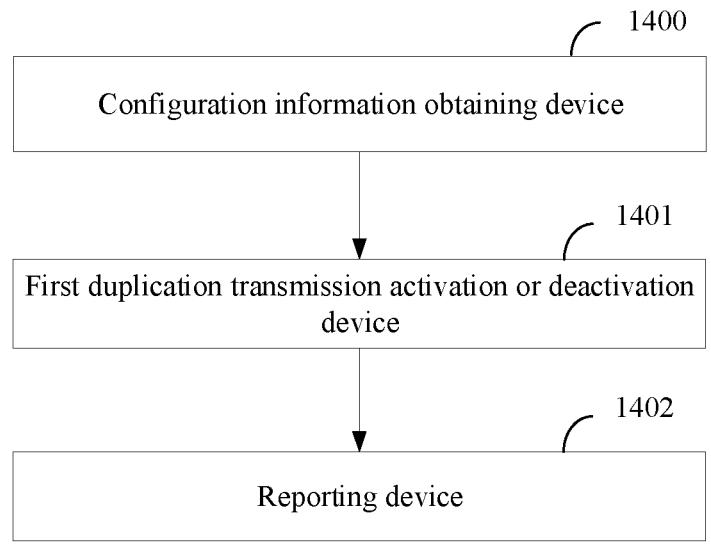
FIG. 14 is a structural schematic diagram of a device for sidelink interface duplication transmission according to an embodiment of the present application.

As shown in FIG. 14, the apparatus includes: a configuration information obtaining device 1400 and a first duplication transmission activation or deactivation device 1401.

The configuration information obtaining device 1400 is configured to obtain duplication transmission configuration information of a sidelink interface.

The first duplication transmission activation or deactivation device 1401 is configured to receive explicit indication information or implicit indication information sent by a network-side device, and determine that at least one radio bearer of the sidelink interface activates or deactivates duplication transmission through the explicit indication information or the implicit indication information.

As a possible implementation, the configuration information obtaining device 1400 is configured to: obtain the duplication transmission configuration information configured by the network-side device for the radio bearer of the sidelink interface of the terminal through an RRC layer dedicated signaling for the terminal in an RRC connected state; or obtain the duplication transmission configuration information configured by the network-side device for a QoS parameter of the sidelink interface of the terminal through a system message for the terminal in an RRC idle state or RRC inactive state; or obtain the duplication transmission configuration information configured for a QoS parameter of the sidelink interface of the terminal through pre-configuration information for the terminal in an offline state.

As a possible implementation, the duplication transmission configuration information configured by the network-side device for the radio bearer of the sidelink interface of the terminal is obtained through the RRC layer dedicated signaling for the terminal in the RRC connected state, and the duplication transmission configuration information includes any one or more of: a source identifier of the sidelink interface; a destination identifier of the sidelink interface; a radio bearer identifier of the radio bearer of the sidelink interface; an identifier of a logical channel used for duplication transmission; an identifier of a carrier or BWP corresponding to each logical channel used for duplication transmission.

As a possible implementation, the duplication transmission configuration information configured by the network-side device for the QoS parameter of the sidelink interface of the terminal is obtained through the system message for the terminal in the RRC idle state or RRC inactive state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission; the duplication transmission configuration information configured for the QoS parameter of the sidelink interface of the terminal is obtained through the pre-configuration information for the terminal in the offline state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

As a possible implementation, the first duplication transmission activation or deactivation device 1401 is configured to: receive the duplication transmission configuration information carrying a radio bearer identifier of the sidelink interface sent by the network-side device through RRC layer dedicated signaling, and determine that the radio bearer of the sidelink interface activates duplication transmission; or receive the duplication transmission configuration information carrying a radio bearer identifier of the sidelink interface sent by the network-side device through RRC layer dedicated signaling in which the radio bearer identifier is defaulted, and determine that the radio bearer of the sidelink interface deactivates duplication transmission; or receive the duplication transmission configuration information carrying a radio bearer identifier of the sidelink interface sent by the network-side device through RRC layer dedicated signaling, where the duplication transmission configuration information includes a duplication transmission activation identifier for the radio bearer; and determine that the radio bearer of the sidelink interface activates duplication transmission; or receive the duplication transmission configuration information carrying a radio bearer identifier of the sidelink interface sent by the network-side device through RRC layer dedicated signaling, where the duplication transmission configuration information includes a duplication transmission deactivation identifier for the radio bearer; and determine that the radio bearer of the sidelink interface deactivates duplication transmission; or receive an MAC CE for controlling duplication transmission activation and/or deactivation of the sidelink interface, and determine that the radio bearer of the sidelink interface activates duplication transmission according to activation indication information corresponding to the radio bearer of the sidelink interface carried by the MAC CE; or receive an MAC CE for controlling duplication transmission activation and/or deactivation of the sidelink interface, and determine that the radio bearer of the sidelink interface deactivates duplication transmission according to deactivation indication information corresponding to the radio bearer of the sidelink interface carried by the MAC CE.

As a possible implementation, the MAC CE for controlling duplication transmission activation and/or deactivation of the sidelink interface includes: communication interface indication information corresponding to the MAC CE, and activation and/or deactivation state indication information corresponding to all radio bearers configured with duplication transmission on the communication interface; or communication interface indication information corresponding to the MAC CE, and activation and/or deactivation state indication information of all logical channels corresponding to each of all radio bearers configured with duplication transmission on the communication interface; or communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

As a possible implementation, when the MAC CE corresponds to radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or when any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE according to identifiers of the logical channels.

As a possible implementation, the communication interface indication information corresponding to the MAC CE is located in an MAC subheader or MAC CE payload of the MAC CE.

As a possible implementation, the first duplication transmission activation or deactivation device 1401 is configured to: receive threshold information corresponding to a transmission parameter of the sidelink interface configured by the network-side device, to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

As a possible implementation, the configured threshold information includes any one or more of: threshold information configured based on the radio bearer of the sidelink interface; threshold information configured based on source and destination identifiers of the sidelink interface; threshold information configured based on a QoS parameter.

As a possible implementation, duplication transmission is determined to be activated when the transmission parameter is lower than the threshold and duplication transmission is determined to be deactivated when the transmission parameter is not lower than the threshold, and the transmission parameter of the sidelink interface includes any one or more of: channel quality of the sidelink interface; signal strength of the sidelink interface; or duplication transmission is determined to be activated when the transmission parameter is not lower than the threshold and duplication transmission is determined to be deactivated when the transmission parameter is lower than the threshold, and the transmission parameter of the sidelink interface includes any one or more of: a quantity of times the sidelink interface continuously receives HARQ NACK feedback; data packet waiting time of the radio bearer of the sidelink interface.

As a possible implementation, the apparatus further includes a reporting device 1402, as shown in FIG. 14.

The reporting device is configured to: report auxiliary information to the network-side device to assist the network-side device in determining to activate or deactivate the radio bearer when determining that an auxiliary information reporting condition for duplication transmission activation or duplication transmission deactivation is satisfied.

As a possible implementation, determining that the auxiliary information reporting condition for duplication transmission activation is satisfied, includes: determining that the auxiliary information reporting condition for duplication transmission activation is satisfied when determining that channel quality or signal strength of the sidelink interface is lower than a threshold; or determining that the auxiliary information reporting condition for duplication transmission activation is satisfied when determining that data packet waiting time of the radio bearer of the sidelink interface with duplication transmission is greater than a threshold; or determining that the auxiliary information reporting condition for duplication transmission activation is satisfied when determining that a quantity of times the sidelink interface continuously receives HARQ NACK feedback is greater than a threshold.

As a possible implementation, determining that the auxiliary information reporting condition for duplication transmission deactivation is satisfied, includes: determining that the auxiliary information reporting condition for duplication transmission deactivation is satisfied when determining that channel quality or signal strength of the sidelink interface is not lower than a threshold; or determining that the auxiliary information reporting condition for duplication transmission deactivation is satisfied when determining that data packet waiting time of the radio bearer of the sidelink interface with duplication transmission is not greater than a threshold; or determining that the auxiliary information reporting condition for duplication transmission deactivation is satisfied when determining that a quantity of times the sidelink interface continuously receives HARQ NACK feedback is not greater than a threshold.

As a possible implementation, the auxiliary information includes any one or more of: source identifier information of the sidelink interface; destination identifier information of the sidelink interface; identifier information of the radio bearer of the sidelink interface; identifier information of the radio bearer of the sidelink interface that exceeds a set threshold of data packet waiting time; identifier information that a set quantity of HARQ NACK feedbacks are continuously received.

As a possible implementation, the identifier information of the radio bearer includes any one of: an identifier of the radio bearer of the sidelink interface; a logical channel identifier of the radio bearer of the sidelink interface; a source identifier of the sidelink interface, a destination identifier of the sidelink interface, and an identifier of the radio bearer of the sidelink interface; a source identifier of the sidelink interface, a destination identifier of the sidelink interface, and a logical channel identifier of the sidelink interface; a source identifier of the sidelink interface, a destination identifier of the sidelink interface, a communication type identifier of the sidelink interface, and an identifier of the radio bearer of the sidelink interface; a source identifier of the sidelink interface, a destination identifier of the sidelink interface, a communication type identifier of the sidelink interface, and a logical channel identifier of the sidelink interface.

Embodiment 12: based on the same embodiments, an embodiment of the present application further provides another apparatus for sidelink interface duplication transmission. Since the apparatus is an apparatus that performs sidelink interface duplication transmission in embodiments of the present application and the principle of the apparatus to solve the problem is similar to that of the method, the implementations of the apparatus can refer to the implementations of the method, and the repeated description thereof will be omitted here.

Figure 15:
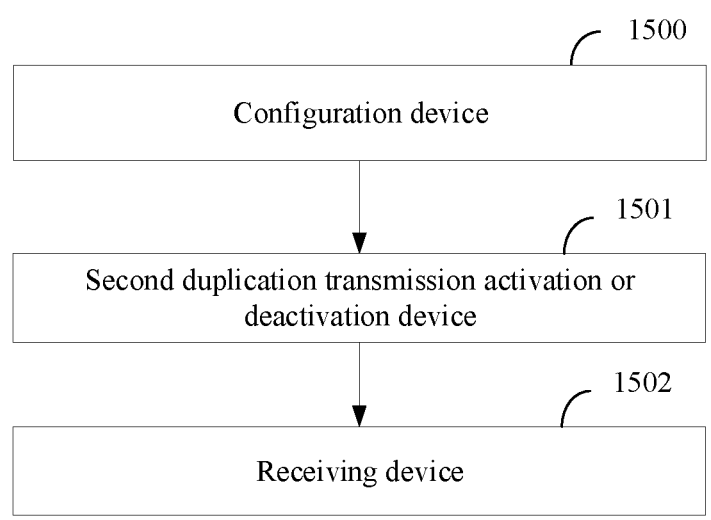
FIG. 15 is a structural schematic diagram of another device for sidelink interface duplication transmission according to an embodiment of the present application.

As shown in FIG. 15, the apparatus includes: a configuration device 1500 and a second duplication transmission activation or deactivation device 1501.

The configuration device 1500 is configured to configure duplication transmission configuration information of a sidelink interface for a terminal.

The second duplication transmission activation or deactivation device 1501 is configured to send explicit indication information or implicit indication information to the terminal, and determine that at least one radio bearer of the sidelink interface activates or deactivates duplication transmission through the explicit indication information or the implicit indication information.

As a possible implementation, the configuration device 1500 is configured to: configure the duplication transmission configuration information for the radio bearer of the sidelink interface of the terminal through an RRC layer dedicated signaling for the terminal in an RRC connected state; or configure the duplication transmission configuration information for a QoS parameter of the sidelink interface of the terminal through a system message for the terminal in an RRC idle state or RRC inactive state; or configure the duplication transmission configuration information for a QoS parameter of the sidelink interface of the terminal through pre-configuration for the terminal in an offline state.

As a possible implementation, the network-side device configures the duplication transmission configuration information for the radio bearer of the sidelink interface of the terminal through the RRC layer dedicated signaling for the terminal in the RRC connected state, and the duplication transmission configuration information includes any one or more of: a source identifier of the sidelink interface; a destination identifier of the sidelink interface; a radio bearer identifier of the radio bearer of the sidelink interface; an identifier of a logical channel used for duplication transmission; an identifier of a carrier or BWP corresponding to each logical channel used for duplication transmission.

As a possible implementation, the network-side device configures the duplication transmission configuration information for the QoS parameter of the sidelink interface of the terminal through the system message for the terminal in the RRC idle state or RRC inactive state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission; the network-side device configures the duplication transmission configuration information for the QoS parameter of the sidelink interface of the terminal through pre-configuration for the terminal in the offline state, and the duplication transmission configuration information includes any one or more of: a source identifier of the sidelink interface; a destination identifier of the sidelink interface; a QoS identifier of the sidelink interface; an identifier of a logical channel used for duplication transmission; an identifier of a carrier or BWP corresponding to each logical channel used for duplication transmission.

As a possible implementation, the second duplication transmission activation or deactivation device 1501 is configured to: send the duplication transmission configuration information carrying a radio bearer identifier of the sidelink interface to the terminal through RRC layer dedicated signaling, and determine that the radio bearer of the sidelink interface activates duplication transmission; or send the duplication transmission configuration information carrying a radio bearer identifier of the sidelink interface to the terminal through RRC layer dedicated signaling in which the radio bearer identifier is defaulted, and determine that the radio bearer of the sidelink interface deactivates duplication transmission; or send the duplication transmission configuration information carrying a radio bearer identifier of the sidelink interface to the terminal through RRC layer dedicated signaling, where the duplication transmission configuration information includes a duplication transmission activation identifier for the radio bearer; and determine that the radio bearer of the sidelink interface activates duplication transmission; or send the duplication transmission configuration information carrying a radio bearer identifier of the sidelink interface to the terminal through RRC layer dedicated signaling, where the duplication transmission configuration information includes a duplication transmission deactivation identifier for the radio bearer; and determine that the radio bearer of the sidelink interface deactivates duplication transmission; or determine that the radio bearer of the sidelink interface activates duplication transmission through activation indication information corresponding to the radio bearer of the sidelink interface carried by an MAC CE for controlling duplication transmission activation and/or deactivation of the sidelink interface; or determine that the radio bearer of the sidelink interface deactivates duplication transmission through deactivation indication information corresponding to the radio bearer of the sidelink interface carried by an MAC CE for controlling duplication transmission activation and/or deactivation of the sidelink interface.

As a possible implementation, the MAC CE for controlling duplication transmission activation and/or deactivation of the sidelink interface includes: communication interface indication information corresponding to the MAC CE, and activation and/or deactivation state indication information corresponding to all radio bearers configured with duplication transmission on the communication interface; or communication interface indication information corresponding to the MAC CE, and activation and/or deactivation state indication information of all logical channels corresponding to each of all radio bearers configured with duplication transmission on the communication interface; or communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

As a possible implementation, when the MAC CE corresponds to radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or when any radio bearer of the sidelink interface corresponding to the MAC CE corresponds to logical channels, the activation and/or deactivation state indication information of all logical channels corresponding to each of all radio bearers of the sidelink interface configured with duplication transmission on the communication interface is arranged in the MAC CE according to identifiers of the logical channels.

As a possible implementation, the communication interface indication information corresponding to the MAC CE is located in an MAC subheader or MAC CE payload of the MAC CE.

As a possible implementation, the second duplication transmission activation or deactivation device 1501 is configured to: configure threshold information corresponding to a transmission parameter of the sidelink interface for the terminal, so that the terminal determines to activate duplication transmission when the transmission parameter is lower than a threshold and deactivate duplication transmission when the transmission parameter is not lower than the threshold, or determines to activate duplication transmission when the transmission parameter is not lower than a threshold and deactivate duplication transmission when the transmission parameter is lower than the threshold.

As a possible implementation, the configured threshold information includes any one or more of: threshold information configured based on the radio bearer of the sidelink interface; threshold information configured based on source and destination identifiers of the sidelink interface; threshold information configured based on a QoS parameter.

As a possible implementation, duplication transmission is determined to be activated when the transmission parameter is lower than the threshold and duplication transmission is determined to be deactivated when the transmission parameter is not lower than the threshold, and the transmission parameter of the sidelink interface includes any one or more of: channel quality of the sidelink interface; signal strength of the sidelink interface; or duplication transmission is determined to be activated when the transmission parameter is not lower than the threshold and duplication transmission is determined to be deactivated when the transmission parameter is lower than the threshold, and the transmission parameter of the sidelink interface includes any one or more of: a quantity of times the sidelink interface continuously receives HARQ NACK feedback; data packet waiting time of the radio bearer of the sidelink interface.

As a possible implementation, the apparatus further includes a receiving device 1502, as shown in FIG. 15.

The receiving device 1502 is configured to: receive auxiliary information reported by the terminal to determine to activate or deactivate the radio bearer.

As a possible implementation, the auxiliary information includes any one or more of: source identifier information of the sidelink interface; destination identifier information of the sidelink interface; identifier information of the radio bearer of the sidelink interface; identifier information of the radio bearer of the sidelink interface that exceeds a set threshold of data packet waiting time; identifier information that a set quantity of HARQ NACK feedbacks are continuously received.

As a possible implementation, the identifier information of the radio bearer includes any one or more of: an identifier of the radio bearer of the sidelink interface; a logical channel identifier of the radio bearer of the sidelink interface; a source identifier of the sidelink interface, a destination identifier of the sidelink interface, and an identifier of the radio bearer of the sidelink interface; a source identifier of the sidelink interface, a destination identifier of the sidelink interface, and a logical channel identifier of the sidelink interface; a source identifier of the sidelink interface, a destination identifier of the sidelink interface, a communication type identifier of the sidelink interface, and an identifier of the radio bearer of the sidelink interface; a source identifier of the sidelink interface, a destination identifier of the sidelink interface, a communication type identifier of the sidelink interface, and a logical channel identifier of the sidelink interface.

An embodiment further provides a computer storage medium, where the program, when executed by a processor, implements steps of the following method: a terminal obtains duplication transmission configuration information of a sidelink interface; the terminal receives explicit indication information or implicit indication information sent by a network-side device, and determines that at least one radio bearer of the sidelink interface activates or deactivates duplication transmission through the explicit indication information or the implicit indication information.

An embodiment further provides a computer storage medium, where the program, when executed by a processor, implements steps of the following method: a network-side device configures duplication transmission configuration information of a sidelink interface for a terminal; the network-side device sends explicit indication information or implicit indication information to the terminal, and determines that at least one radio bearer of the sidelink interface activates or deactivates duplication transmission through the explicit indication information or the implicit indication information.

The present application has been described above by reference to the block diagrams and/or flow charts showing the methods, devices (systems) and/or computer program products according to embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can include, store, communicate with, transmit or transfer the programs, to be used by the instruction execution system, apparatus or device, or used in combination with the instruction execution system, apparatus or device.

What is claimed is:

1. A method for sidelink interface duplication transmission, comprising:
    obtaining, by a terminal, duplication transmission configuration information of a sidelink interface; and
    receiving, by the terminal, explicit indication information or implicit indication information sent by a network-side device, and determining that at least one radio bearer of the sidelink interface activates or deactivates duplication transmission through the explicit indication information or the implicit indication information;
    wherein the explicit indication information is Radio Resource Control (RRC) layer dedicated signaling or a Media Access Control Control Element (MAC CE);
    wherein receiving, by the terminal, the implicit indication information sent by the network-side device, and determining that the radio bearer of the sidelink interface activates or deactivates duplication transmission through the implicit indication information, comprises:
    receiving, by the terminal, threshold information corresponding to a transmission parameter of the sidelink interface configured by the network-side device, to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

2. The method of claim 1, wherein obtaining, by the terminal, the duplication transmission configuration information of the sidelink interface, comprises:
    obtaining the duplication transmission configuration information configured by the network-side device for the radio bearer of the sidelink interface of the terminal through the RRC layer dedicated signaling for the terminal in an RRC connected state; or
    obtaining the duplication transmission configuration information configured by the network-side device for a Quality of Service, (QoS), parameter of the sidelink interface of the terminal through a system message for the terminal in an RRC idle state or RRC inactive state; or
    obtaining the duplication transmission configuration information configured for a QoS parameter of the sidelink interface of the terminal through pre-configuration information for the terminal in an offline state.

3. The method of claim 2, wherein the duplication transmission configuration information configured by the network-side device for the radio bearer of the sidelink interface of the terminal is obtained through the RRC layer dedicated signaling for the terminal in the RRC connected state, and the duplication transmission configuration information comprises any one or more of:
- a source identifier of the sidelink interface;
- a destination identifier of the sidelink interface;
- a radio bearer identifier of the radio bearer of the sidelink interface;
- an identifier of a logical channel used for duplication transmission;
- an identifier of a carrier or Bandwidth Part; (BWP), corresponding to each logical channel used for duplication transmission; or
- wherein the duplication transmission configuration information configured by the network-side device for the QoS parameter of the sidelink interface of the terminal is obtained through the system message for the terminal in the RRC idle state or RRC inactive state, and the duplication transmission configuration information comprises any one or more of:
- a source identifier of the sidelink interface;
- a destination identifier of the sidelink interface;
- a QoS identifier of the sidelink interface;
- an identifier of a logical channel used for duplication transmission;
- an identifier of a carrier or Bandwidth Part; (BWP), corresponding to each logical channel used for duplication transmission;
- the duplication transmission configuration information configured for the QoS parameter of the sidelink interface of the terminal is obtained through the pre-configuration information for the terminal in the offline state, and the duplication transmission configuration information comprises any one or more of:
- a source identifier of the sidelink interface;
- a destination identifier of the sidelink interface;
- a QoS identifier of the sidelink interface;
- an identifier of a logical channel used for duplication transmission;
- an identifier of a carrier or Bandwidth Part; (BWP), corresponding to each logical channel used for duplication transmission.

4. The method of claim 1, wherein receiving, by the terminal, the explicit indication information sent by the network-side device, and determining that the radio bearer of the sidelink interface activates or deactivates duplication transmission through the explicit indication information, comprises:
- receiving, by the terminal, the duplication transmission configuration information carrying a radio bearer identifier of the sidelink interface sent by the network-side device through the RRC layer dedicated signaling, and determining that the radio bearer of the sidelink interface activates duplication transmission; or
- receiving, by the terminal, the duplication transmission configuration information carrying a radio bearer identifier of the sidelink interface sent by the network-side device through the RRC layer dedicated signaling in which the radio bearer identifier is defaulted, and determining that the radio bearer of the sidelink interface deactivates duplication transmission; or
- receiving, by the terminal, the duplication transmission configuration information carrying a radio bearer identifier of the sidelink interface sent by the network-side device through the RRC layer dedicated signaling, wherein the duplication transmission configuration information comprises a duplication transmission activation identifier for the radio bearer; and determining that the radio bearer of the sidelink interface activates duplication transmission; or
- receiving, by the terminal, the duplication transmission configuration information carrying a radio bearer identifier of the sidelink interface sent by the network-side device through the RRC layer dedicated signaling, wherein the duplication transmission configuration information comprises a duplication transmission deactivation identifier for the radio bearer; and determining that the radio bearer of the sidelink interface deactivates duplication transmission; or
- receiving, by the terminal, the MAC CE, for controlling duplication transmission activation and/or deactivation of the sidelink interface, and determining that the radio bearer of the sidelink interface activates duplication transmission according to activation indication information corresponding to the radio bearer of the sidelink interface carried by the MAC CE; or
- receiving, by the terminal, the MAC CE for controlling duplication transmission activation and/or deactivation of the sidelink interface, and determining that the radio bearer of the sidelink interface deactivates duplication transmission according to deactivation indication information corresponding to the radio bearer of the sidelink interface carried by the MAC CE.

5. The method of claim 4, wherein the MAC CE for controlling duplication transmission activation and/or deactivation of the sidelink interface comprises:
- communication interface indication information corresponding to the MAC CE, and activation and/or deactivation state indication information corresponding to all radio bearers configured with duplication transmission on the communication interface; or
- communication interface indication information corresponding to the MAC CE, and activation and/or deactivation state indication information of all logical channels corresponding to each of all radio bearers configured with duplication transmission on the communication interface; or
- communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or
- communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

6. The method of claim 5, wherein, when the MAC CE corresponds to a plurality of radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or
when any radio bearer of the sidelink interface corresponding to the MAC CE corresponds to a plurality of logical channels, the activation and/or deactivation state indication information of all logical channels corresponding to each of all radio bearers of the sidelink interface configured with duplication transmission on the communication interface is arranged in the MAC CE according to identifiers of the logical channels; or wherein the communication interface indication information corresponding to the MAC CE is located in an MAC subheader or MAC CE payload of the MAC CE.

7. The method of claim 1,
wherein the configured threshold information comprises any one or more of:
threshold information configured based on the radio bearer of the sidelink interface;
threshold information configured based on source and destination identifiers of the sidelink interface;
threshold information configured based on a QoS parameter; or
wherein duplication transmission is determined to be activated when the transmission parameter is lower than the threshold and duplication transmission is determined to be deactivated when the transmission parameter is not lower than the threshold, and the transmission parameter of the sidelink interface comprises any one or more of:
channel quality of the sidelink interface;
signal strength of the sidelink interface; or
duplication transmission is determined to be activated when the transmission parameter is not lower than the threshold and duplication transmission is determined to be deactivated when the transmission parameter is lower than the threshold, and the transmission parameter of the sidelink interface comprises any one or more of:
a quantity of times the sidelink interface continuously receives Hybrid Automatic Repeat reQuest Negative ACKnowledge, (HARQ NACK), feedback;
data packet waiting time of the radio bearer of the sidelink interface.

8. The method according to claim 1, further comprising:
reporting, by the terminal, auxiliary information to the network-side device to assist the network-side device in determining to activate or deactivate the radio bearer when determining that an auxiliary information reporting condition for duplication transmission activation or duplication transmission deactivation is satisfied.

9. The method of claim 8, wherein determining that the auxiliary information reporting condition for duplication transmission activation is satisfied, comprises:
determining that the auxiliary information reporting condition for duplication transmission activation is satisfied when determining that channel quality or signal strength of the sidelink interface is lower than a threshold; or
determining that the auxiliary information reporting condition for duplication transmission activation is satisfied when determining that data packet waiting time of the radio bearer of the sidelink interface with duplication transmission is greater than a threshold; or
determining that the auxiliary information reporting condition for duplication transmission activation is satisfied when determining that a quantity of times the sidelink interface continuously receives HARQ NACK feedback is greater than a threshold; or
wherein determining that the auxiliary information reporting condition for duplication transmission deactivation is satisfied, comprises:
determining that the auxiliary information reporting condition for duplication transmission deactivation is satisfied when determining that channel quality or signal strength of the sidelink interface is not lower than a threshold; or
determining that the auxiliary information reporting condition for duplication transmission deactivation is satisfied when determining that data packet waiting time of the radio bearer of the sidelink interface with duplication transmission is not greater than a threshold; or
determining that the auxiliary information reporting condition for duplication transmission deactivation is satisfied when determining that a quantity of times the sidelink interface continuously receives HARQ NACK feedback is not greater than a threshold.

10. The method of claim 8, wherein the auxiliary information comprises any one or more of:
source identifier information of the sidelink interface;
destination identifier information of the sidelink interface;
identifier information of the radio bearer of the sidelink interface;
identifier information of the radio bearer of the sidelink interface that exceeds a set threshold of data packet waiting time;
identifier information that a set quantity of HARQ NACK feedbacks are continuously received; or
wherein the identifier information of the radio bearer comprises any one of:
an identifier of the radio bearer of the sidelink interface;
a logical channel identifier of the radio bearer of the sidelink interface;
a source identifier of the sidelink interface, a destination identifier of the sidelink interface, and an identifier of the radio bearer of the sidelink interface;
a source identifier of the sidelink interface, a destination identifier of the sidelink interface, and a logical channel identifier of the sidelink interface;
a source identifier of the sidelink interface, a destination identifier of the sidelink interface, a communication type identifier of the sidelink interface, and an identifier of the radio bearer of the sidelink interface;
a source identifier of the sidelink interface, a destination identifier of the sidelink interface, a communication type identifier of the sidelink interface, and a logical channel identifier of the sidelink interface.

11. A method for sidelink interface duplication transmission, comprising:
configuring, by a network-side device, duplication transmission configuration information of a sidelink interface for a terminal;
sending, by the network-side device, explicit indication information or implicit indication information to the terminal, and determining that at least one radio bearer of the sidelink interface activates or deactivates duplication transmission through the explicit indication information or the implicit indication information;
wherein the explicit indication information is Radio Resource Control (RRC) layer dedicated signaling or a Media Access Control Control Element (MAC CE);
wherein sending, by the network-side device, the implicit indication information to the terminal, and determining that the radio bearer of the sidelink interface activates or deactivates duplication transmission through the implicit indication information, comprises:
configuring, by the network-side device, threshold information corresponding to a transmission parameter of the sidelink interface for the terminal, for the terminal determining to activate duplication transmission when the transmission parameter is lower than a threshold and deactivate duplication transmission when the transmission parameter is not lower than the threshold, or for the terminal determining to activate duplication transmission when the transmission parameter is not lower than a threshold and deactivate duplication transmission when the transmission parameter is lower than the threshold.

12. The method of claim 11, wherein configuring, by the network-side device, the duplication transmission configuration information of the sidelink interface for the terminal, comprises:

configuring, by the network-side device, the duplication transmission configuration information for the radio bearer of the sidelink interface of the terminal through the RRC layer dedicated signaling for the terminal in an RRC connected state; or configuring, by the network-side device, the duplication transmission configuration information for a Quality of Service, (QoS), parameter of the sidelink interface of the terminal through a system message for the terminal in an RRC idle state or RRC inactive state; or configuring, by the network-side device, the duplication transmission configuration information for a QoS parameter of the sidelink interface of the terminal through pre-configuration for the terminal in an offline state.

13. The method of claim 12, wherein the network-side device configures the duplication transmission configuration information for the radio bearer of the sidelink interface of the terminal through the RRC layer dedicated signaling for the terminal in the RRC connected state, and the duplication transmission configuration information comprises any one or more of:

a source identifier of the sidelink interface;
a destination identifier of the sidelink interface;
a radio bearer identifier of the radio bearer of the sidelink interface;
an identifier of a logical channel used for duplication transmission;
an identifier of a carrier or Bandwidth Part (BWP) corresponding to each logical channel used for duplication transmission; or
wherein the network-side device configures the duplication transmission configuration information for the QoS parameter of the sidelink interface of the terminal through the system message for the terminal in the RRC idle state or RRC inactive state, and the duplication transmission configuration information comprises any one or more of:
a source identifier of the sidelink interface;
a destination identifier of the sidelink interface;
a QoS identifier of the sidelink interface;
an identifier of a logical channel used for duplication transmission;
an identifier of a carrier or Bandwidth Part, (BWP), corresponding to each logical channel used for duplication transmission;
the network-side device configures the duplication transmission configuration information for the QoS parameter of the sidelink interface of the terminal through pre-configuration for the terminal in the offline state, and the duplication transmission configuration information comprises any one or more of:
a source identifier of the sidelink interface;
a destination identifier of the sidelink interface;
a QoS identifier of the sidelink interface;
an identifier of a logical channel used for duplication transmission;
an identifier of a carrier or Bandwidth Part, (BWP), corresponding to each logical channel used for duplication transmission.

14. The method of claim 11, wherein sending, by the network-side device, the explicit indication information to the terminal, and determining that the radio bearer of the sidelink interface activates or deactivates duplication transmission through the explicit indication information, comprises:

sending, by the network-side device, the duplication transmission configuration information carrying a radio bearer identifier of the sidelink interface to the terminal through the RRC layer dedicated signaling, and determining that the radio bearer of the sidelink interface activates duplication transmission; or sending, by the network-side device, the duplication transmission configuration information carrying a radio bearer identifier of the sidelink interface to the terminal through the RRC layer dedicated signaling in which the radio bearer identifier is defaulted, and determining that the radio bearer of the sidelink interface deactivates duplication transmission; or sending, by the network-side device, the duplication transmission configuration information carrying a radio bearer identifier of the sidelink interface to the terminal through the RRC layer dedicated signaling, wherein the duplication transmission configuration information comprises a duplication transmission activation identifier for the radio bearer; and determining that the radio bearer of the sidelink interface activates duplication transmission; or sending, by the network-side device, the duplication transmission configuration information carrying a radio bearer identifier of the sidelink interface to the terminal through the RRC layer dedicated signaling, wherein the duplication transmission configuration information comprises a duplication transmission deactivation identifier for the radio bearer; and determining that the radio bearer of the sidelink interface deactivates duplication transmission; or determining, by the network-side device, that the radio bearer of the sidelink interface activates duplication transmission through activation indication information corresponding to the radio bearer of the sidelink interface carried by the MAC CE for controlling duplication transmission activation and/or deactivation of the sidelink interface; or determining, by the network-side device, that the radio bearer of the sidelink interface deactivates duplication transmission through deactivation indication information corresponding to the radio bearer of the sidelink interface carried by the MAC CE for controlling duplication transmission activation and/or deactivation of the sidelink interface.

15. The method of claim 14, wherein the MAC CE for controlling duplication transmission activation and/or deactivation of the sidelink interface comprises:

communication interface indication information corresponding to the MAC CE, and activation and/or deactivation state indication information corresponding to all radio bearers configured with duplication transmission on the communication interface; or communication interface indication information corresponding to the MAC CE, and activation and/or deactivation state indication information of all logical channels corresponding to each of all radio bearers configured with duplication transmission on the communication interface; or communication interface indication information corresponding to the MAC CE, a source identifier of the sidelink interface, a destination identifier of the sidelink interface, and activation and/or deactivation state indication information corresponding to all radio bearers of the sidelink interface with the source and destination identifiers and configured with duplication transmission; or communication interface indication information corresponding to the MAC CE, a source identifier of the sidelink interface, a destination identifier of the sidelink interface, and activation and/or deactivation state indication information of all logical channels corresponding to each of all radio bearers of the sidelink interface with the source and destination identifiers and configured with duplication transmission.

16. The method of claim 15, wherein, when the MAC CE corresponds to a plurality of radio bearers of the sidelink interface, the activation and/or deactivation state indication information corresponding to all radio bearers of the sidelink interface configured with duplication transmission on the communication interface is arranged in the MAC CE according to identifiers of the radio bearers of the sidelink interface; and/or when any radio bearer of the sidelink interface corresponding to the MAC CE corresponds to a plurality of logical channels, the activation and/or deactivation state indication information of all logical channels corresponding to each of all radio bearers of the sidelink interface configured with duplication transmission on the communication interface is arranged in the MAC CE according to identifiers of the logical channels; or wherein the communication interface indication information corresponding to the MAC CE is located in an MAC subheader or MAC CE payload of the MAC CE.

17. The method of claim 11,
wherein the configured threshold information comprises any one or more of:
threshold information configured based on the radio bearer of the sidelink interface;
threshold information configured based on source and destination identifiers of the sidelink interface;
threshold information configured based on a QoS parameter; or
wherein duplication transmission is determined to be activated when the transmission parameter is lower than the threshold and duplication transmission is determined to be deactivated when the transmission parameter is not lower than the threshold, and the transmission parameter of the sidelink interface comprises any one or more of:
channel quality of the sidelink interface;
signal strength of the sidelink interface; or
duplication transmission is determined to be activated when the transmission parameter is not lower than the threshold and duplication transmission is determined to be deactivated when the transmission parameter is lower than the threshold, and the transmission parameter of the sidelink interface comprises any one or more of:
a quantity of times the sidelink interface continuously receives Hybrid Automatic Repeat reQuest Negative ACKnowledge, (HARQ NACK), feedback;

data packet waiting time of the radio bearer of the sidelink interface.

18. The method of claim 11, further comprising:
receiving, by the network-side device, auxiliary information reported by the terminal to determine to activate or deactivate the radio bearer.

19. The method of claim 18, wherein the auxiliary information comprises any one or more of:
source identifier information of the sidelink interface;
destination identifier information of the sidelink interface;
identifier information of the radio bearer of the sidelink interface;
identifier information of the radio bearer of the sidelink interface that exceeds a set threshold of data packet waiting time;
identifier information that a set quantity of HARQ NACK feedbacks are continuously received; or
wherein the identifier information of the radio bearer comprises any one or more of:
an identifier of the radio bearer of the sidelink interface;
a logical channel identifier of the radio bearer of the sidelink interface;
a source identifier of the sidelink interface, a destination identifier of the sidelink interface, and an identifier of the radio bearer of the sidelink interface;
a source identifier of the sidelink interface, a destination identifier of the sidelink interface, and a logical channel identifier of the sidelink interface;
a source identifier of the sidelink interface, a destination identifier of the sidelink interface, a communication type identifier of the sidelink interface, and an identifier of the radio bearer of the sidelink interface;
a source identifier of the sidelink interface, a destination identifier of the sidelink interface, a communication type identifier of the sidelink interface, and a logical channel identifier of the sidelink interface.

20. A terminal for sidelink interface duplication transmission, comprising a processor and a memory;
the memory is configured to store program instructions executable by the processor;
the processor is configured to read program instructions in the memory and perform operations of:
obtaining duplication transmission configuration information of a sidelink interface; receiving explicit indication information or implicit indication information sent by a network-side device, and determining that at least one radio bearer of the sidelink interface activates or deactivates duplication transmission through the explicit indication information or the implicit indication information;
wherein the explicit indication information is Radio Resource Control (RRC) layer dedicated signaling or a Media Access Control Control Element (MAC CE);
wherein the processor is configured to:
receive threshold information corresponding to a transmission parameter of the sidelink interface configured by the network-side device, to determine to activate duplication transmission when the transmission parameter is lower than a threshold and deactivate duplication transmission when the transmission parameter is not lower than the threshold, or determine to activate duplication transmission when the transmission parameter is not lower than a threshold and deactivate duplication transmission when the transmission parameter is lower than the threshold.

* * * * *